US012686640B2

(12) United States Patent
Vernhes et al.

(10) Patent No.: US 12,686,640 B2
(45) Date of Patent: Jul. 21, 2026

(54) MECHANICAL PART WITH A NANOSTRUCTURED TiO₂—CR₂O₃ CERAMIC COATING AND METHOD FOR DEPOSITING A NANOSTRUCTURED TiO₂—CR₂O₃ CERAMIC COATING ON A SUBSTRATE

(71) Applicant: VELAN INC., Montreal (CA)

(72) Inventors: Luc Vernhes, Hampstead (CA); Nicolas Lourdel, Montreal (CA); Rogerio S. Lima, Boucherville (CA); Dominique Poirier, Boucherville (CA)

(73) Assignee: VELAN INC., Montreal (CA)

( * ) Notice: Subject to any disclaimer, the term of this patent is extended or adjusted under 35 U.S.C. 154(b) by 0 days.

(21) Appl. No.: 18/805,056

(22) Filed: Aug. 14, 2024

(65) Prior Publication Data

US 2025/0011242 A1     Jan. 9, 2025

Related U.S. Application Data

(60) Division of application No. 16/952,761, filed on Nov. 19, 2020, now abandoned, which is a continuation of (Continued)

(51) Int. Cl.
*C23C 4/12*          (2016.01)
*C04B 35/46*          (2006.01)

(Continued)

(52) U.S. Cl.
CPC ........ *C04B 35/46* (2013.01); *C04B 35/62222* (2013.01); *C23C 4/11* (2016.01);

(Continued)

(58) Field of Classification Search
CPC .............. C04B 35/46; C04B 35/62222; C04B 2235/3232; C04B 2235/3241;

(Continued)

(56) References Cited

U.S. PATENT DOCUMENTS

2008/0182114 A1* 7/2008 Kim ........................ C23C 4/11
106/14.05
2013/0095340 A1* 4/2013 Sivakumar ................ C23C 4/11
977/890
2015/0329954 A1* 11/2015 Quet ....................... C23C 4/129
427/446

OTHER PUBLICATIONS

Lima, Abrasion behavior of nanostructured and conventional titania coatings thermally sprayed via APS, VPS and HVOF, International Thermal Spray Conference, 2004, p. 1-6 (Year: 2006).*

* cited by examiner

*Primary Examiner* — Dah-Wei D. Yuan
*Assistant Examiner* — Nga Leung V Law
(74) *Attorney, Agent, or Firm* — ROBIC

(57)          ABSTRACT

There is provided a method for depositing a TiO₂—Cr₂O₃ ceramic coating on a substrate. The method includes mixing a powder of sprayable nanostructured titanium(IV) oxide (n-TiO₂) and a powder of chromium(III) oxide (Cr₂O₃), thereby obtaining a n-TiO₂—Cr₂O₃ powder blend. The method also includes thermal spraying particles of the n-TiO₂—Cr₂O₃ powder blend on the substrate at an in-flight particle temperature of or greater than 2350° C. and a particle in-flight velocity of or greater than 350 m/s, thereby obtaining a coated substrate.

19 Claims, 17 Drawing Sheets

Related U.S. Application Data application No. 14/708,760, filed on May 11, 2015, now abandoned.

(60) Provisional application No. 61/993,776, filed on May 15, 2014, provisional application No. 61/992,202, filed on May 12, 2014.

(51) Int. Cl.

| | |
|---|---|
| *C04B 35/622* | (2006.01) |
| *C23C 4/11* | (2016.01) |
| *C23C 4/134* | (2016.01) |
| *C23C 24/04* | (2006.01) |
| *F16K 5/06* | (2006.01) |
| *F16K 25/00* | (2006.01) |
| *F16K 25/04* | (2006.01) |

(52) U.S. Cl.

CPC ................ *C23C 4/12* (2013.01); *C23C 4/134* (2016.01); *C23C 24/04* (2013.01); *F16K 5/06* (2013.01); *F16K 5/0657* (2013.01); *F16K 25/005* (2013.01); *F16K 25/04* (2013.01); *C04B 2235/3232* (2013.01); *C04B 2235/3241* (2013.01); *C04B 2235/5454* (2013.01); *C04B 2235/96* (2013.01)

(58) Field of Classification Search

CPC ........ C04B 2235/5454; C04B 2235/96; C23C 4/11; C23C 4/12; C23C 4/134; C23C 24/04; F16K 5/06; F16K 5/0657; F16K 25/005; F16K 25/04

See application file for complete search history.

(d) n-TiO$_2$- Cr$_2$O$_3$ (c) n-TiO$_2$ (b) TiO$_2$-Cr$_2$O$_3$ (a) Cr$_2$O$_3$ (h) n-TiO₂- Cr₂O₃

(g) n-TiO₂

(f) TiO₂-Cr₂O₃

(e) Cr₂O₃

(b) Cr₂O₃ rotating specimen after step 4

(d) TiO₂-Cr₂O₃ rotating specimen after step 3

(a) Cr₂O₃ fixed specimen after step 4

(c) TiO₂-Cr₂O₃ fixed specimen after step 3

(f) n-TiO₂ rotating
specimen after step 2

(h) n-TiO₂-Cr₂O₃ rotating
specimen after step 4

(e) n-TiO₂ fixed
specimen after step 2

(g) n-TiO₂-Cr₂O₃ fixed
specimen after step 4

MECHANICAL PART WITH A NANOSTRUCTURED TiO₂—CR₂O₃ CERAMIC COATING AND METHOD FOR DEPOSITING A NANOSTRUCTURED TiO₂—CR₂O₃ CERAMIC COATING ON A SUBSTRATE

CROSS-REFERENCE TO RELATED APPLICATIONS

This application is a divisional of U.S. application Ser. No. 16/952,761, which is a continuation of U.S. application Ser. No. 14/708,760, filed on May 11, 2015, which claims the priority benefit from U.S. provisional patent application 61/992,202 filed on May 12, 2014, Canadian patent application 2,851,633 filed on May 12, 2014, and U.S. provisional patent application 61/993,776 filed on May 15, 2014, the specifications of which being hereby incorporated by reference in their entirety.

TECHNICAL FIELD

This invention generally relates to the field of thermal spray coatings, and more particularly to nanostructured ceramic thermal spray coatings having a good resistance to abrasion, erosion or corrosion, as well as methods for their production and use.

BACKGROUND

Ceramics are known for being hard and stiff materials. Ceramic thermal spray coatings have been extensively used as anti-wear coatings, and are important to protect various mechanical parts of machines from harsh abrasive conditions encountered in corrosive processes such as Pressure Oxidation (POx) and High Pressure Acid Leach (HPAL), notably in hydrometallurgy applications.

Over the last two decades, metal-seated ball valves (MSBVs) have become the industry standard for hydrometallurgy application, providing tight, reliable shut-off in this critical service which facilitates maintenance and contributes to a safe working environment. Typical MSBVs design for this application consists of a floating ball in contact with a fixed seat. Ball and seats are manufactured with either titanium or duplex stainless steels substrates and protected with a ceramic coating. The primary function of the ceramic coating is to enhance the load carrying capacity and the tribological performance of the base material in order to extend the in-service life of the equipment, especially during ball motion phases.

Many thermal ceramic coatings have already been developed for protecting mechanical parts from harsh abrasive conditions. For example, conventional Cr₂O₃ applied by Air Plasma Spray (APS) was the coating selected 20 years ago to protect MSBVs against the extreme abrasion, pressure and elevated temperature inherent to the Pressure Oxidation (POx) recovery process used for gold wherein the ore is mixed with oxygen and sulfuric acid into an autoclave. Over the years, silicon dioxide and titanium dioxide have been gradually added to the originally pure Cr₂O₃ in order to improve its ductility and toughness.

Conventional titanium(IV) dioxide (TiO₂) and nanostructured titanium(IV) oxide (n-TiO₂) coatings have also been proposed but they show limited mechanical and tribological performances, leading to high wear rates. Additionally, it has also been shown that blends of conventional TiO₂ and Cr₂O₃ (TiO₂—Cr₂O₃) offer superior tribological performances compared to TiO₂, mainly due to the presence of Cr₂O₃. Optimized balance between the hard and brittle Cr₂O₃ phases and the soft and ductile conventional TiO₂ phases yields to higher abrasion, sliding and galling resistance.

However, despite the developments in thermal spray coatings, maintenance costs on coated parts such as balls and seats of industrial valves remain high. There is therefore still a need for an improved technology.

SUMMARY

According to a general aspect, there is provided a method for depositing a ceramic coating on a substrate, the method comprising: mixing a powder of sprayable nanostructured titanium(IV) oxide (n-TiO₂) and a powder of chromium(III) oxide (Cr₂O₃), thereby obtaining a n-TiO₂—Cr₂O₃ powder blend; and thermal spraying particles of the n-TiO₂—Cr₂O₃ powder blend on the substrate at an average in-flight particle temperature of or greater than 2350° C. and an average particle in-flight velocity of or greater than 350 m/s, thereby obtaining a coated substrate.

In some implementations, the substrate is a metal substrate.

In some implementations, the metal substrate comprises one of titanium, a titanium alloy, stainless steel, steel, a high-performance nickel alloy, a high-performance cobalt alloy, bronze and a copper alloy.

In some implementations, the metal substrate comprises one of titanium and stainless steel.

In some implementations, the powder of sprayable n-TiO₂ comprises nanosized constituents agglomerated and/or sintered in microsized n-TiO₂ particles.

In some implementations, the nanosized constituents have a size ranging from 50 nm to 500 nm.

In some implementations, the microsized n-TiO₂ particles have a diameter distribution ranging from 4 μm to 100 μm.

In some implementations, the n-TiO₂—Cr₂O₃ powder blend comprises 40 wt % to 70 wt % of n-TiO₂ and 30 wt % to 60 wt % of Cr₂O₃.

In some implementations, the n-TiO₂—Cr₂O₃ blend comprises 50 wt % to 60 wt % of n-TiO₂ and 40 wt % to 50 wt % of Cr₂O₃.

In some implementations, the n-TiO₂—Cr₂O₃ blend comprises 53 wt % to 57 wt % of n-TiO₂ and 43 wt % to 47 wt % of Cr₂O₃.

In some implementations, the n-TiO₂—Cr₂O₃ blend comprises about 55 wt % of n-TiO₂ and about 45 wt % of Cr₂O₃.

In some implementations, the thermal spraying is air plasma spraying (APS).

In some implementations, the average in-flight particle temperature is 2350° C. to 2800° C.

In some implementations, the average in-flight particle temperature is 2400° C. to 2800° C.

In some implementations, the average in-flight particle temperature is 2500° C. to 2800° C.

In some implementations, the average in-flight particle temperature is of about 2590° C.

In some implementations, the average particle in-flight velocity is greater than 400 m/s.

In some implementations, the average particle in-flight velocity is greater than 450 m/s.

In some implementations, the average particle in-flight velocity is about 457 m/s.

According to another general aspect, there is provided a mechanical part coated with a nanostructured titanium(IV) oxide-chromium(III) oxide (n-TiO₂—Cr₂O₃) coating, the coating having a microhardness of at least 1000 HV and a dry abrasion volume loss of less than 15 $mm^3$.

In some implementations, the microhardness is of at least 1150 HV.

In some implementations, the dry abrasion loss is less than 8.4 $mm^3$.

In some implementations, the microhardness is between 1150 and 1250 HV and the dry abrasion loss is between 7 and 8.4 $mm^3$.

In some implementations, the n-$TiO_2$—$Cr_2O_3$ coating comprises 40 wt % to 70 wt % of n-$TiO_2$ and 30 wt % to 60 wt % of $Cr_2O_3$.

In some implementations, the n-$TiO_2$—$Cr_2O_3$ coating comprises 50 wt % to 60 wt % of n-$TiO_2$ and 40 wt % to 50 wt % of $Cr_2O_3$.

In some implementations, the n-$TiO_2$—$Cr_2O_3$ coating comprises 53 wt % to 57 wt % of n-$TiO_2$ and 43 wt % to 47 wt % of $Cr_2O_3$.

In some implementations, the n-$TiO_2$—$Cr_2O_3$ coating comprises about 55 wt % of n-$TiO_2$ and about 45 wt % of $Cr_2O_3$.

In some implementations, the mechanical part is a valve element of a valve.

In some implementations, the valve element is a ball of a ball-valve.

In some implementations, the ceramic coating is deposited using the method of described above.

According to another general aspect, there is provided a powder blend for use in thermal spraying for coating a substrate, the powder blend comprising 40 wt % to 70 wt % of sprayable n-$TiO_2$ and 30 wt % to 60 wt % of $Cr_2O_3$.

In some implementations, the powder blend comprises 50 wt % to 60 wt % of n-$TiO_2$ and 40 wt % to 50 wt % of $Cr_2O_3$.

In some implementations, the powder blend comprises 53 wt % to 57 wt % of n-$TiO_2$ and 43 wt % to 47 wt % of $Cr_2O_3$.

In some implementations, the powder blend comprises about 55 wt % of n-$TiO_2$ and about 45 wt % of $Cr_2O_3$.

BRIEF DESCRIPTION OF DRAWINGS

FIG. 1 includes FIGS. 1A, 1B and 1C.

FIG. 2 includes FIG. 2A and FIG. 2B.

FIG. 3 includes FIG. 3A and FIG. 3B.

FIG. 4 includes FIG. 4A and FIG. 4B.

FIG. 5 includes FIG. 5A and FIG. 5B.

DETAILED DESCRIPTION

Figure 1A:
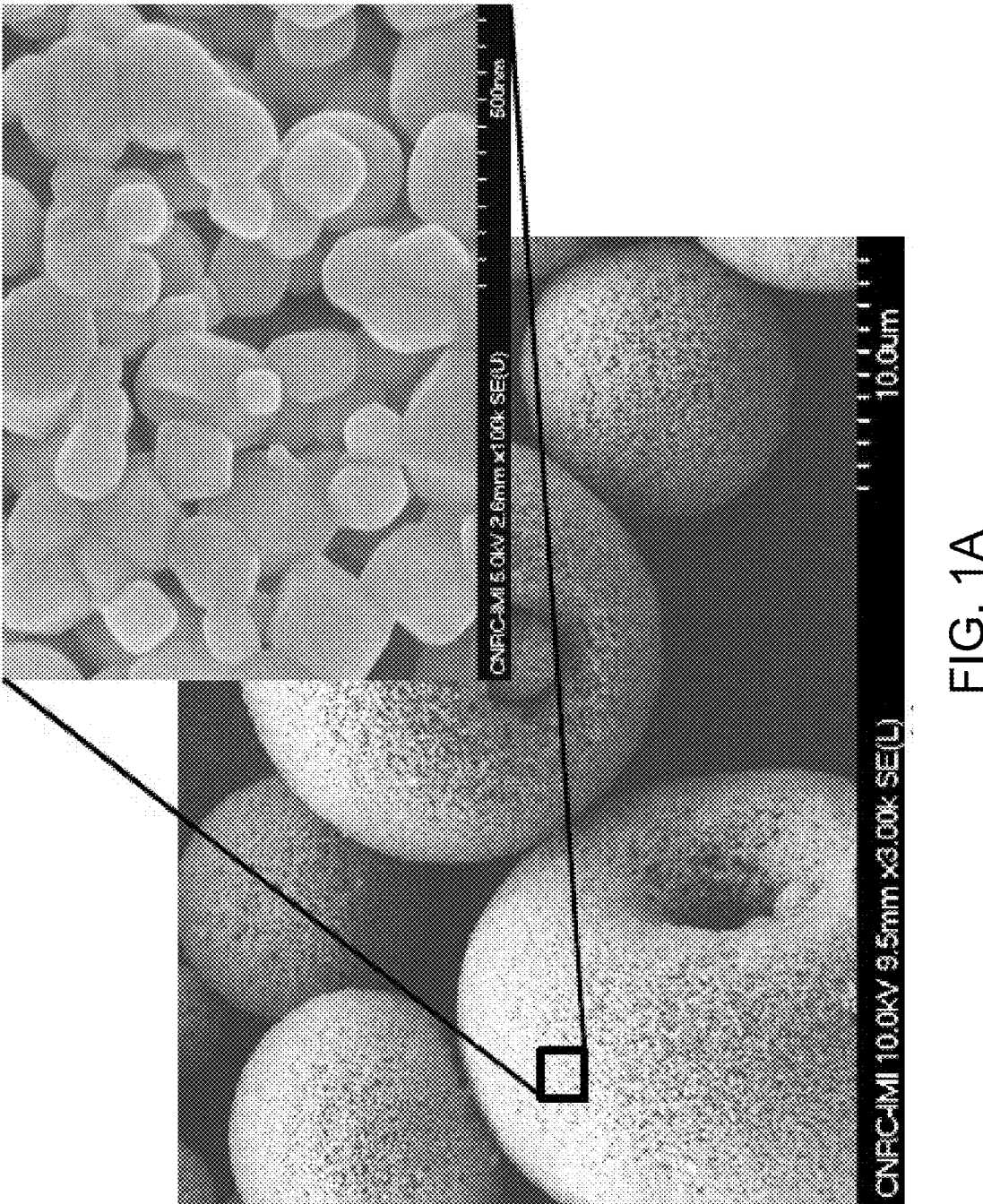
FIG. 1A is a scanning electron micrograph showing a sprayable nanostructured n-$TiO_2$ powder.

A method for depositing a ceramic coating on a substrate is described. The method includes mixing a powder of sprayable nanostructured titanium(IV) oxide (n-$TiO_2$) and a powder of chromium(III) oxide ($Cr_2O_3$), thereby obtaining a n-$TiO_2$—$Cr_2O_3$ blend. The method also includes thermal spraying particles of the n-$TiO_2$—$Cr_2O_3$ blend on the substrate at an in-flight particle temperature greater than 2350° C. and a particle in-flight velocity greater than 350 m/s, thereby obtaining a coated substrate.

As usual, the in-flight particle temperature and the particle in-flight velocity is measured at the spray distance i.e. the linear distance between the thermal spray torch nozzle and the substrate surface.

It should be understood that "thermal spraying" refers to a technique wherein melted (or heated) materials are sprayed onto a surface. The feedstock (or coating precursor) is heated by electrical (plasma or arc) or chemical means (combustion flame). The feedstock may be in the form of a powder, wires or a liquid/suspension containing the material to be sprayed. Thermal spraying includes different variations, such as air plasma spraying, detonation spraying, wire arc spraying, flame spraying, high velocity oxy-fuel spraying, warm spraying and cold spraying. Typically, a thermal spray system includes: a spray torch for performing the melting and acceleration of the particles to be deposited; a feeder for supplying the feedstock (powder, wire or liquid) to the torch, for example through tubes; and media supply such as gases or liquids for the generation of the flame or plasma jet, and optionally a carrier gas for carrying the powder feedstock, when applicable.

In some implementations, the substrate is a metal substrate. The metal substrate may include one of titanium, a titanium alloy, stainless steel, steel, a high-performance nickel alloy, a high-performance cobalt alloy, bronze and a copper alloy. In some implementations, the substrate is a mechanical part which may be used in a mechanical assembly or a mechanical device. In some implementations, the mechanical part is of the type to be subjected to harsh abrasive conditions such as Pressure Oxidation (POx) and/or High Pressure Acid Leach (HPAL). For example, the mechanical part may be a ball or a seat of a ball-valve, or a valve element of a valve which is subjected to wear due to friction with other parts of the valve during movement. It is understood that the valve may be an industrial valve or any other type of valve. It is also understood that the mechanical part may be a suitable mechanical part used for example in autoclaves or other apparatuses which can be subjected to harsh abrasive conditions. Other non-limiting examples of mechanical parts include sucker rod couplings, autoclave impellers and pumps.

It should be understood that a "powder of sprayable nanostructured" component refers to the component in the form of a powder having microsized particles comprising nanosized constituents, the particles being suitable for being thermally sprayed on a substrate. A "sprayable" component may also refer to a suspension (or slurry) including particles which are to be sprayed. In the case of a suspension, the liquid containing the particles is directly sprayed to form the coating. The liquid is evaporated under the effect of the high temperatures and the suspended particles can thereby form the coating.

Figure 1B:
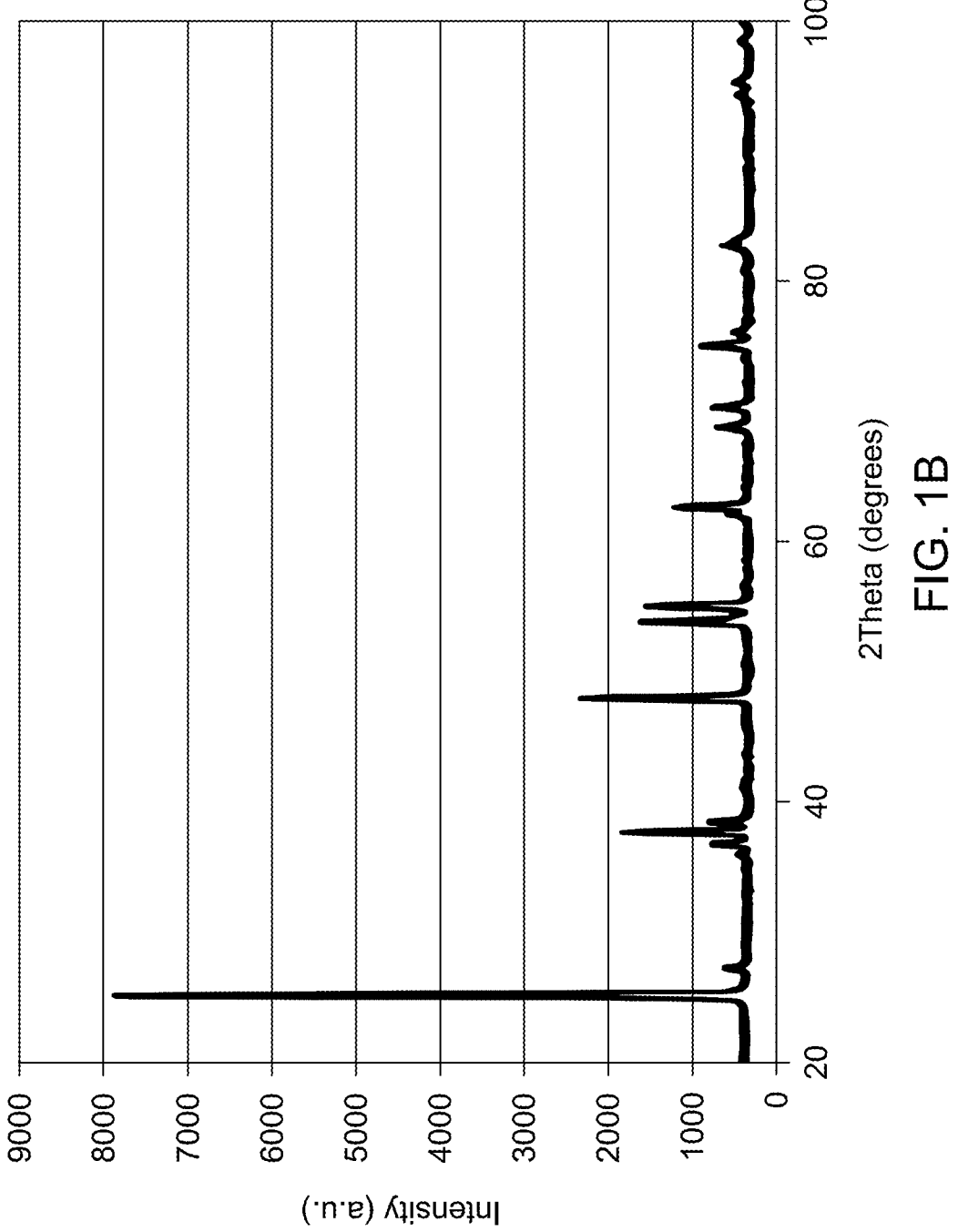
FIG. 1B is a XRD pattern of the sprayable nanostructured n-$TiO_2$ powder.
Figure 1C:
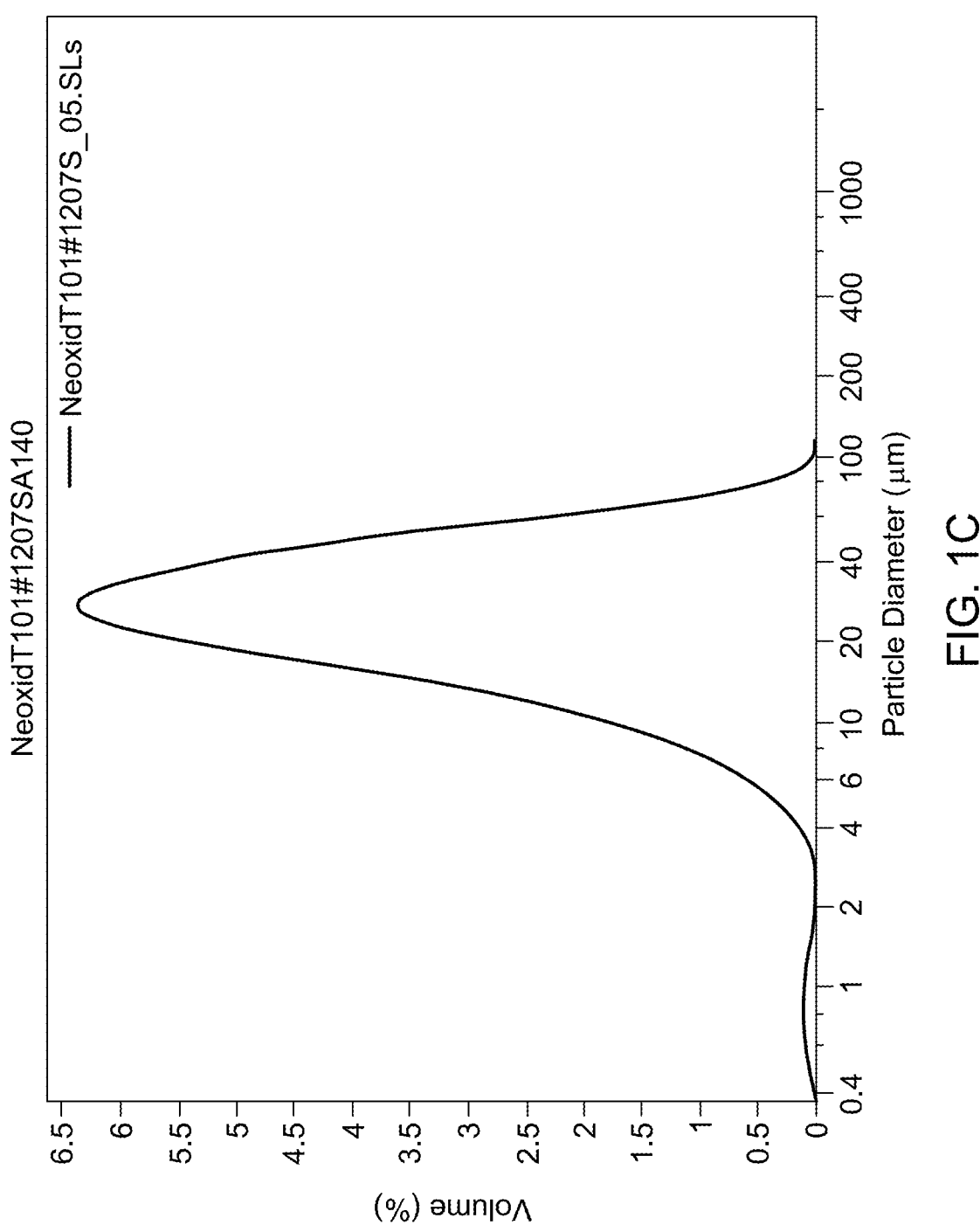
FIG. 1C is a graph representing the particle size distribution of the sprayable nanostructured n-$TiO_2$ powder.
Figure 2B:
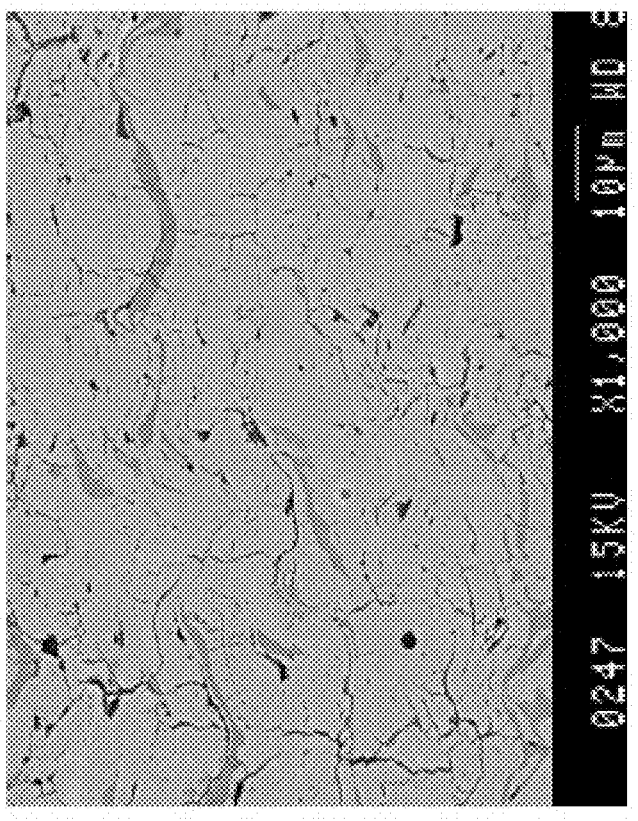
FIG. 2B is a ×1000 scanning electron micrograph of the same $Cr_2O_3$ coating.
Figure 2B:
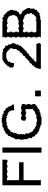
Figure 2A:
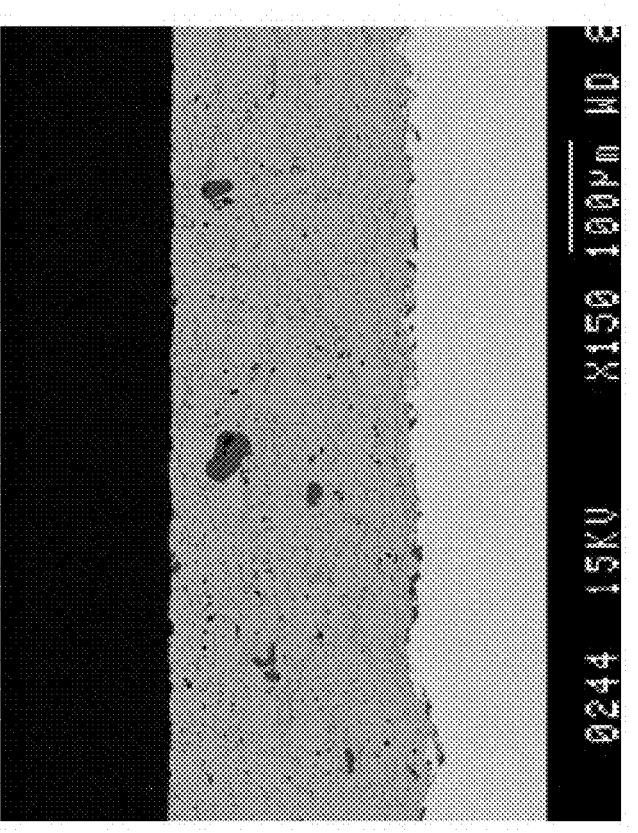
FIG. 2A is a ×150 scanning electron micrograph of a conventional prior art $Cr_2O_3$ coating.
Figure 3B:
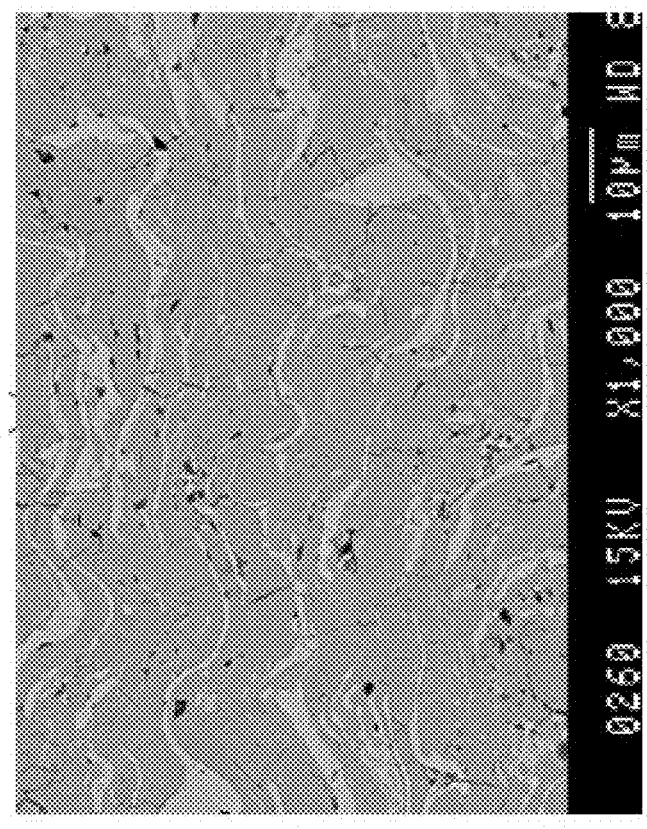
FIG. 3B is a ×1000 scanning electron micrograph of the same $TiO_2$—$Cr_2O_3$ coating.
Figure 3A:
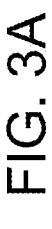
FIG. 3A is a ×150 scanning electron micrograph of a conventional prior art $TiO_2$—$Cr_2O_3$ coating.
Figure 4B:
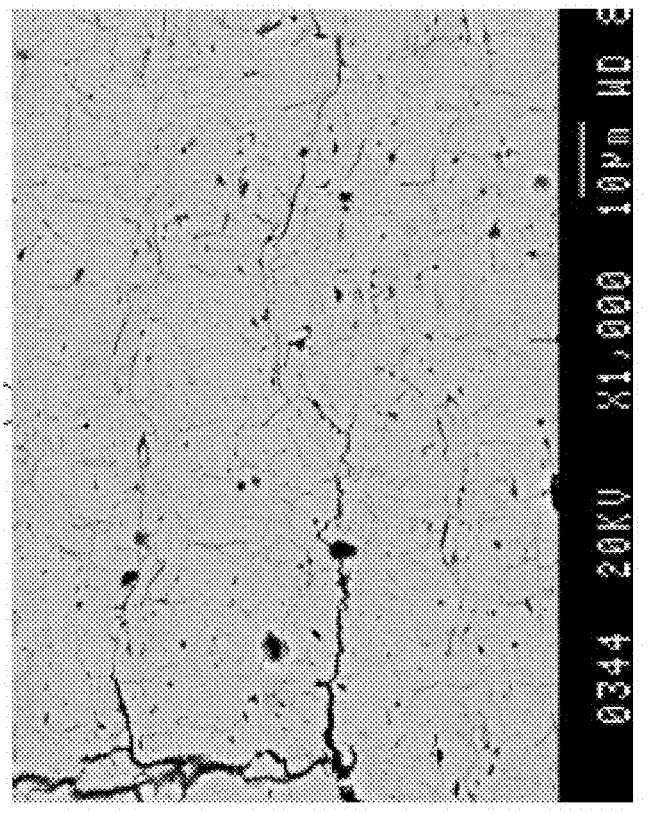
FIG. 4B is a ×1000 scanning electron micrograph of the same n-$TiO_2$ coating.
Figure 4A:
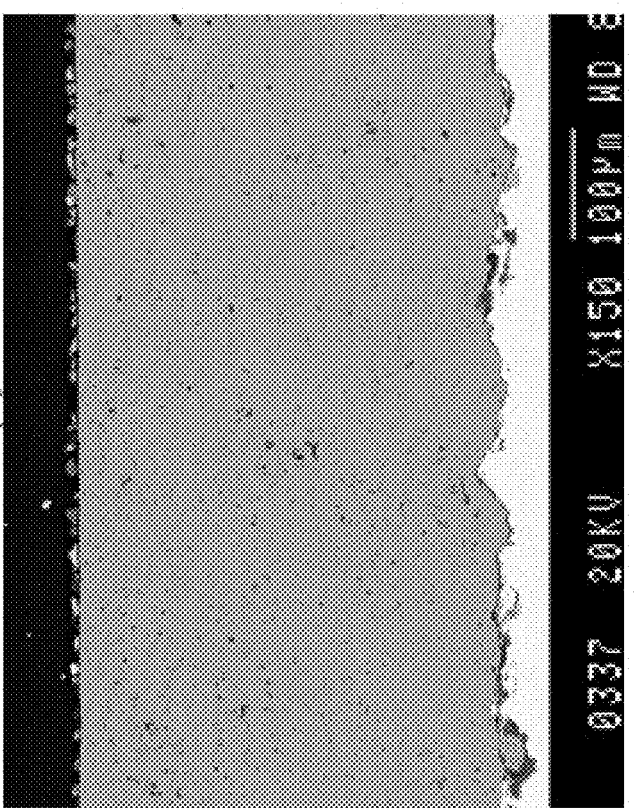
FIG. 4A is a ×150 scanning electron micrograph of a conventional prior art n-$TiO_2$ coating.
Figure 5B:
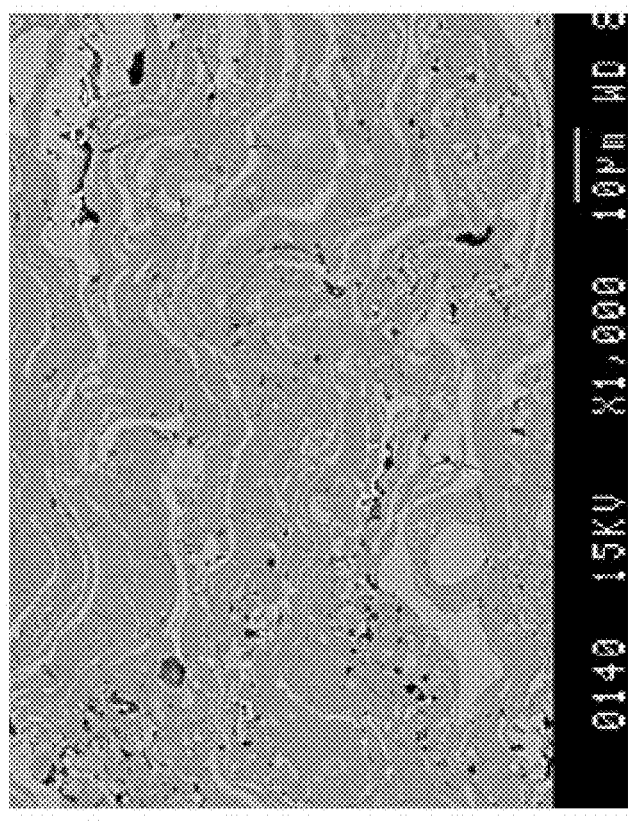
FIG. 5B is a ×1000 scanning electron micrograph of the same n-$TiO_2$—$Cr_2O_3$ coating.
Figure 5A:
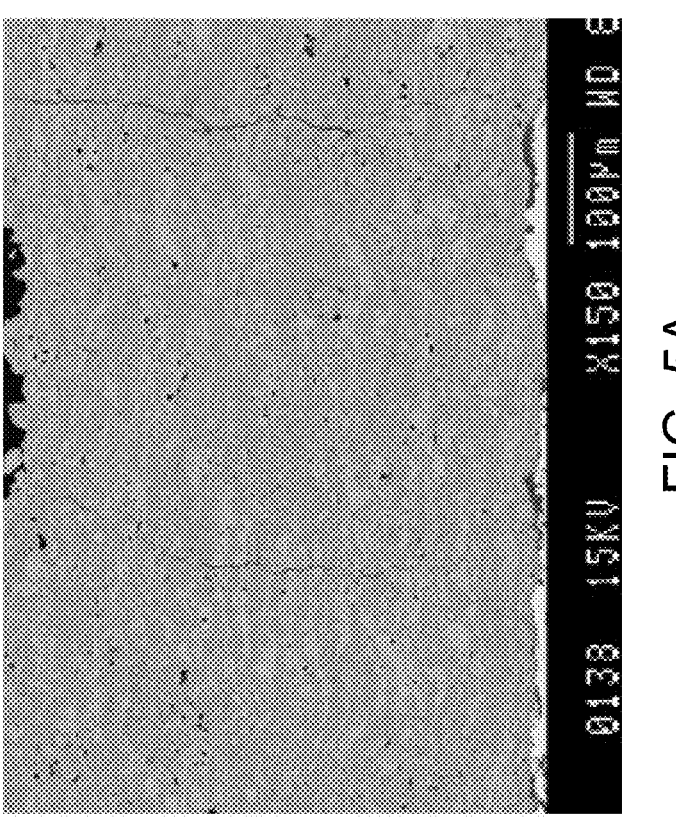
FIG. 5A is a ×150 scanning electron micrograph of a n-$TiO_2$—$Cr_2O_3$ coating according to the invention.

In some implementations, the powder of sprayable n-TiO$_2$ comprises nanosized constituents agglomerated and/or sintered in microsized TiO$_2$ particles, as can be seen in FIGS. 1A to 1C. The nanosized constituents may have a size ranging from 50 nm to 500 nm, and the microsized n-TiO$_2$ particles may have a diameter distribution ranging from 4 μm to 100 μm.

In some implementations, the powder of n-TiO$_2$ and the powder of Cr$_2$O$_3$ are mechanically mixed in order to obtain the n-TiO$_2$—Cr$_2$O$_3$ powder blend.

In some implementations, the n-TiO$_2$—Cr$_2$O$_3$ powder blend includes 40 wt % to 70 wt % of n-TiO$_2$ and 30 wt % to 60 wt % of Cr$_2$O$_3$. The n-TiO$_2$—Cr$_2$O$_3$ powder blend may also include 50 wt % to 60 wt % of n-TiO$_2$ and 40 wt % to 50 wt % of Cr$_2$O$_3$, or 53 wt % to 57 wt % of n-TiO$_2$ and 43 wt % to 47 wt % of Cr$_2$O$_3$. For example, the n-TiO$_2$—Cr$_2$O$_3$ blend may include about 55 wt % of n-TiO$_2$ and about 45 wt % of Cr$_2$O$_3$.

In some implementations, the thermal spraying is air plasma spraying (APS). Various parameters of the torch can be tuned so as to control the in-flight particle temperature and the particle in-flight velocity. The parameters of the torch that can be tuned include but are not limited to the Argon flow, H$_2$ flow and N$_2$ flow, as well as the current and spraying distance. While these parameters are dependent on the torch used, they help controlling the in-flight particle temperature and the particle in-flight velocity, which are the physical parameters of the particles during spraying.

As mentioned above, it is understood that the in-flight particle temperature and the particle in-flight velocity are both measured at the spray distance. By "measured at the spray distance", it is meant the linear distance between the thermal spray torch nozzle and the substrate surface.

In some implementations, the in-flight particle temperature is greater than the melting point of Cr$_2$O$_3$ i.e. greater than 2350° C. For example, the average in-flight particle temperature may be 2350° C. to 2800° C., 2400° C. to 2800° C., 2500° C. to 2800° C. or about 2590° C. with a sample standard deviation of about 200 to 300° C. i.e. more or less 100° C. which represent the instrument error of the measuring instrument.

In some implementations, the average particle in-flight velocity is greater than 350 m/s, greater than 400 m/s, or greater than 450 m/s. For example, the average particle in-flight velocity may be of about 457 m/s with a sample standard variation of about 50 to 100 m/s, i.e. more or less 5 m/s, which represent the instrument error of the measuring instrument.

A substrate coated with a nanostructured titanium(IV) oxide-chromium(III) oxide (n-TiO$_2$—Cr$_2$O$_3$) coating is also described. The n-TiO$_2$—Cr$_2$O$_3$ coating may be deposited on the substrate using the method described above. These coatings have certain improved properties compared to the Cr$_2$O$_3$ coatings, conventional TiO$_2$—Cr$_2$O$_3$ blend coatings, or n-TiO$_2$ coatings known in the art.

For example, the n-TiO$_2$—Cr$_2$O$_3$ coating has a microhardness of at least 1000 HV and a dry abrasion volume loss of less than 15 mm$^3$. In some implementations, the n-TiO$_2$—Cr$_2$O$_3$ coating has a microhardness of at least 1150 HV. In some implementations, the dry abrasion loss is less than 8.4 mm$^3$. In some implementations, the microhardness is between 1150 and 1250 HV and the dry abrasion loss is between 7 and 8.4 mm$^3$.

The values of microhardness are obtained as follows. Microhardness measurements were performed on coating polished cross-sections with a Buehler Micromet II Tester (Vickers Tip) under 300 gf load. For each specimen, a minimum of 12 indentations was performed (straight line pattern, at the center of the coating cross-section), and the highest and lowest values removed from the dataset.

The dry abrasion loss was measured as follows. Coating dry abrasion resistance was tested through dry sand/rubber wheel abrasion test (ASTM G65/procedure D-modified, 45 N, 2000 wheel revolutions, Durometer A-60 wheel). Two samples were tested for each coating type. Prior testing, the sample surfaces were ground with diamond wheel to produce a surface finish of about 0.2-0.3 μm i.e more or less 0.05 μm, which represent the instrument error of the measuring instrument. Evaluation of the sample volume loss due to the test was performed with an optical profilometer.

EXAMPLES

Example 1

Base Materials

Experiments were performed by preparing several powders and powder blends to be used for Air Plasma Spray (APS) coating. An n-TiO$_2$—Cr$_2$O$_3$ powder blend was manufactured for coating substrates. Three (3) comparative powders/powder blends were also manufactured for coating substrates and for comparison with the properties of the n-TiO$_2$—Cr$_2$O$_3$ powder blend.

The following powder materials were selected, and obtained by mixing when applicable.

Comparative Material A: Cr$_2$O$_3$ powder supplied by Velan supplier.

Comparative Material B: TiO$_2$—Cr$_2$O$_3$ powder supplied by Velan supplier and obtained by mechanically mixing conventional TiO$_2$ powder with Material A.

Comparative Material C: nanostructured n-TiO$_2$ powder supplied by Millydine. This nanostructured n-TiO$_2$ powder is formed of nanosized constituents agglomerated and sintered in bigger microsized particles to allow spraying. The n-TiO$_2$ microstructure, XRD pattern and size distribution are shown in FIG. 1.

Material D: n-TiO$_2$—Cr$_2$O$_3$ powder. Material D was obtained by mechanically mixing 55 wt % of n-TiO$_2$ (Material C) with 45 wt % of a Cr$_2$O$_3$ powder (Metco™ 106). Metco 106 is a fused, sintered and crushed Cr$_2$O$_3$ powder.

Example 2

Deposition of the Materials

Experiments were performed to coat substrates with materials A, B, C and D of Example 1. All coatings were deposited by Air Plasma Spraying (APS). All coatings were applied onto titanium grade 5 coupons (compliant with ASTM B348) that were previously grit blasted ($Al_2O_3$—grit 24). A nominal coating thickness of 0.020″ (500 μm) was targeted.

Materials A and B were deposited using an SG100 plasma spray torch from Praxair. Material C was deposited using a high power Mettech Axial III APS torch. The spraying parameters for coatings A, B and C are shown in Table 1 below.

TABLE 1

| Spraying parameters for coatings A, B and C. | | | |
| --- | --- | --- | --- |
| | $Cr_2O_3$ Coating A | $TiO_2$—$Cr_2O_3$ Coating B | n-$TiO_2$ Coating C |
| Torch | SG-100 | SG-100 | Mettech Axial III |
| Ar flow (lpm) | 53 | 53 | 37.5 |
| H2 flow (lpm) | — | — | 37.5 |
| N2/He flow (lpm) | 41 He | 41 He | 75 N2 |

TABLE 1-continued

| Spraying parameters for coatings A, B and C. | | | |
| --- | --- | --- | --- |
| | $Cr_2O_3$ Coating A | $TiO_2$—$Cr_2O_3$ Coating B | n-$TiO_2$ Coating C |
| Current (A) | 800 | 800 | 230* |
| Voltage (V) | ~42 | ~42 | 152 |
| Power (kW) | 33.6 | 33.6 | 105 |
| Net Power (kW) or Enthalpy (kJ/L) | — | — | 15.0 kJ/L |
| Nozzle | 730 Anode/ 129 Cathode | 730 Anode/ 129 Cathode | ³⁄₈″ |
| Spraying Distance (cm) | 6.35 | 6.35 | 14 |
| Feedrate (g/min) | ~30 | ~30 | 18 |
| Ar Carrier Gas (lpm) | 5 | 5 | 9 |
| In-flight Temperature | | | 2578 ± 166** |
| In-flight Velocity (m/s) | — | — | 269 ± 45** |

*Current per electrode set-3 electrode sets in the torch.
**The standard deviation corresponds to the sample distribution, and not the experimental error.
***Approximation; velocity higher than the standardized range.

For Material D, the gas flows, current and spraying distances were varied in order to produce coatings with different structures and properties. The different spraying parameters used (coatings D1 to D4) are presented in Table 2 below. In-flight particle temperature and velocity are measured by the thermal spray sensor DPV 2000 (Tecnar Automation).

TABLE 2

| Spraying parameters for coatings D1, D2, D3 and D4 | | | |
| --- | --- | --- | --- |
| | n-$TiO_2$—$Cr_2O_3$ Coating D1 | n-$TiO_2$—$Cr_2O_3$ Coating D2 | n-$TiO_2$—$Cr_2O_3$ Coating D3 | n-$TiO_2$—$Cr_2O_3$ Coating D4 |
| Torch | Mettech Axial III | Mettech Axial III | Mettech Axial III | Mettech Axial III |
| Ar flow (lpm) | 37.5 | 37.5 | 62.5 | 75.0 |
| H2 flow (lpm) | 37.5 | 37.5 | 62.5 | 30.0 |
| N2/He flow (lpm) | 75 | 75 | 125 N2 | 45.0 |
| Current (A) | 230* | 230* | 230* | 230* |
| Voltage (V) | 205 | 205 | 205 | 205 |
| Power (kW) | 141 | 141 | 141 | 141 |
| Net Power (kW) or Enthalpy (kJ/L) | 18.2 kJ/L | 18.2 kJ/L | 18.2 kJ/L | 18.2 kJ/L |
| Nozzle | 3/8″ | 3/8″ | 3/8″ | 3/8″ |
| Spraying Distance (cm) | 14 | 10 | 14 | 14 |
| Feedrate (g/min) | 18 | 18 | 18 | 18 |
| Ar Carrier Gas (lpm) | 9 | 9 | 9 | 9 |
| In-flight Temperature | 2447 | 2562 | 2590 ± 258** | 2278 |
| In-flight Velocity (m/s) | 242 | 269 | 457*** ± 91** | 240 |

*Current per electrode set-3 electrode sets in the torch.
**The standard deviation corresponds to the sample distribution, and not the experimental error.
***Approximation; velocity higher than the standardized range.

Example 3

Example 5

Microstructure

Microstructures of the coatings were obtained with a JSM-6100 SEM from JEOL or the FE-SEM Hitachi S4700, under back scattered electron (BSE) mode. EDS analyses were performed using JEOL JSM-840 SEM. Coatings were sectioned with a coolant-assisted diamond wheel and then cold vacuum mounted in an epoxy resin. Grinding and polishing were done using standard metallographic preparation procedures.

The microstructure of coatings A, B, C and D3 of Example 2 are shown in FIGS. 2A, 2B, 3A, 3B, 4A, 4B, 5A and 5B. The two phases present in the coatings with a powder blend feedstock are $Cr_2O_3$ (light grey) and $TiO_2$ (dark grey) respectively. All coatings showed low levels of porosity. Fine cracks seen in particles and at particle boundaries are thought to be formed due to quenching. The large cracks were typically formed as stress relief due to stresses from CTE mismatch with the substrate and/or residual stresses within the coating.

Example 4

Energy Dispersive X-Ray Spectroscopy (EDS)

Figure 6:
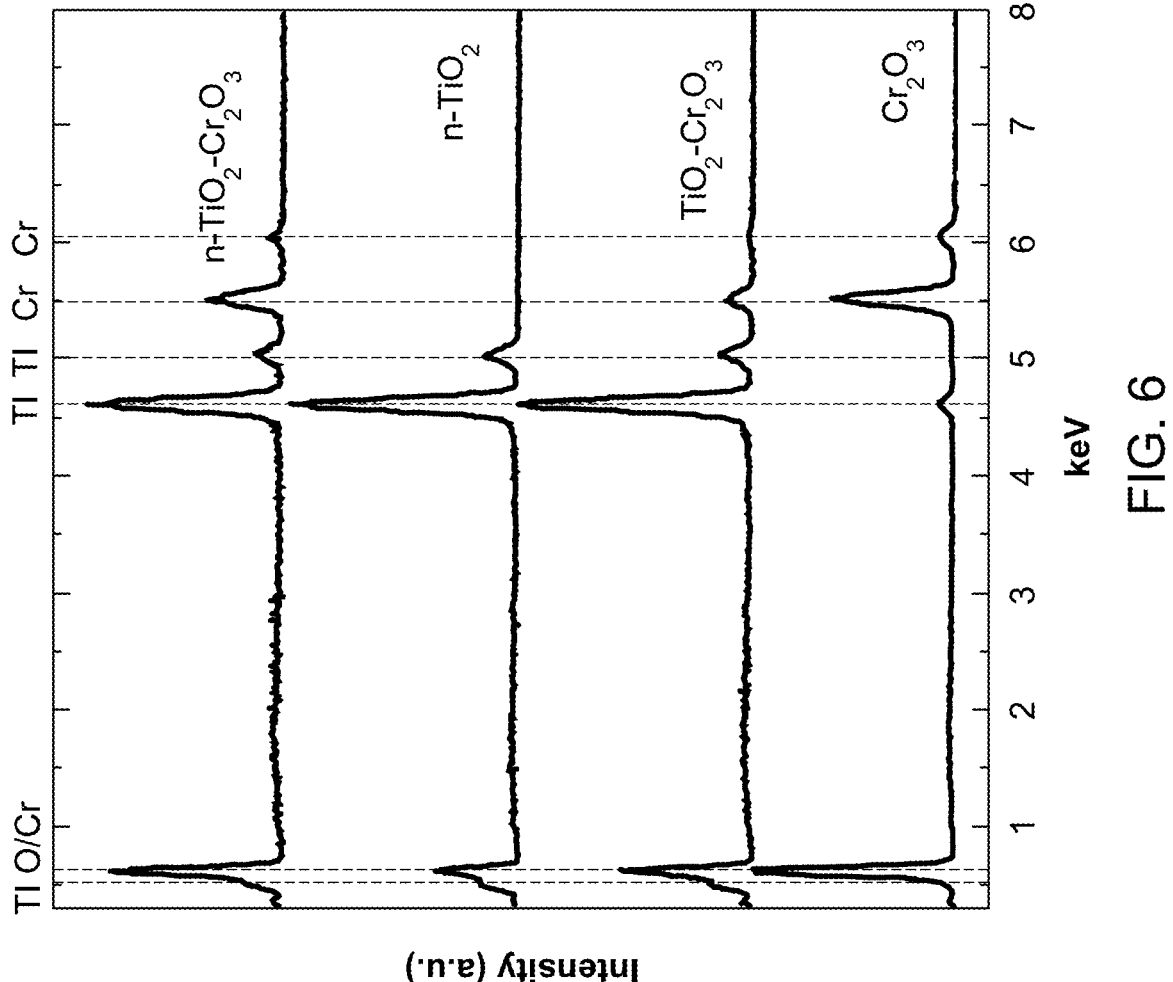
FIG. 6 is a graph showing EDS spectra of $Cr_2O_3$, $Cr_2O_3$—$TiO_2$, n-$TiO_2$ and n-$TiO_2$—$Cr_2O_3$ coatings.

EDS spectra acquired from the four coatings A, B, C and D3 are shown in FIG. 6. The chemical composition of each coating is confirmed.

Mechanical Properties

Microhardness and shear strength were measured using respectively microhardness indentation testers and universal tensile testing equipment.

Microhardness measurements were performed on coating polished cross-sections with a Buehler Micromet II Tester (Vickers Tip) under 300 gf load. For each specimen, a minimum of 12 indentations was performed (straight line pattern, at the center of the coating cross-section), and the highest and lowest values removed from the dataset.

Coating adhesion on titanium substrates was assessed through shear tests (ASTM F1044). An Instron 5582 universal testing machine was used to determine the maximum shear loads required to obtain sample separation.

Toughness was measured by indenting the cross-section of the coatings using a Vickers tip and a load of 1 kgf, and then measuring the length of the cracks formed at the tip of the indentation. The shorter were the cracks, the tougher was the coating.

Microhardness, Toughness and Shear Strength

Microhardness and toughness values were measured for $n$-$TiO_2$—$Cr_2O_3$ coatings D1 to D4, and shown in Table 3 below. It was found that coating D3 exhibited the best microhardness and toughness properties and was then further compared to coatings A, B and C.

TABLE 3

| Microhardness and Toughness values for coatings D1, D2, D3 and D4. | | | | |
|---|---|---|---|---|
| | $n$-$TiO_2$—$Cr_2O_3$ Coating D1 | $n$-$TiO_2$—$Cr_2O_3$ Coating D2 | $n$-$TiO_2$—$Cr_2O_3$ Coating D3 | $n$-$TiO_2$—$Cr_2O_3$ Coating D4 |
| Microhardness (HV-300gf, n = 10) | 829 ± 52 | 902 ± 28 | 1200 ± 49 | 798 ± 18 |
| Toughness (μm) | 222 ± 27 | 176 ± 13 | 132 ± 10 | 254 ± 22 |

Microhardness and shear strength values for coatings A, B, C and D3 are shown in Table 4 below. As expected, the highest microhardness is achieved when the hardest phase, $Cr_2O_3$, is primary used for the coating. The second highest coating in microhardness is the $n$-$TiO_2$—$Cr_2O_3$ coating D3.

TABLE 4

| Microhardness and shear strength values for coatings A, B, C and D3. | | | | |
|---|---|---|---|---|
| | $Cr_2O_3$ Coating A | $TiO_2$—$Cr_2O_3$ Coating B | $n$-$TiO_2$ Coating C | $n$-$TiO_2$—$Cr_2O_3$ Coating D3 |
| Microhardness (HV-300gf, n = 10) | 1423 ± 62 | 912 ± 42 | 729 ± 46 | 1200 ± 49 |
| Shear Strength (MPa, n = 5) | 42 ± 7[d] | 46 ± 2[b] | 36 ± 2[a] | 38 ± 5[a] |

[a]Adhesive failure (occurs at bond line with substrate)

[b]Epoxy failure (glue)

[c]Cohesive failure (failure within the coating)

[d]Mix mode of all or partial of the above

It can be seen that the n-$TiO_2$—$Cr_2O_3$ (coating D3) has an unexpected higher microhardness compared to the conventional $TiO_2$—$Cr_2O_3$ (coating B). The higher power of the torch together with the high gas flow used provides very high in-flight particle speed, which may contribute to improve overall coating quality.

All coatings produced were found to provide good bonding to the substrate. The best coating adhesion in shear is achieved with $TiO_2$—$Cr_2O_3$ (coating B). Even though the variation in coating adhesion is relatively low, it can also be seen that n-$TiO_2$ and n-$TiO_2$—$Cr_2O_3$ (coatings C and D3) display lower adhesion. This is believed to be due to the higher thickness of those coatings. Thicker thermal sprayed coatings typically display lower adhesion due to the buildup of residual stresses.

Example 6

Tribo-Mechanical Properties

Wear resistance of coatings A, B, C and D3 under different conditions such as sliding wear and abrasion were measured by standard pin-on-disc tests and abrasion tests. Galling resistance was also measured for coatings A, B, C and D3 using a custom-designed and automated galling tester.

Sliding Wear Resistance

Figure 9:
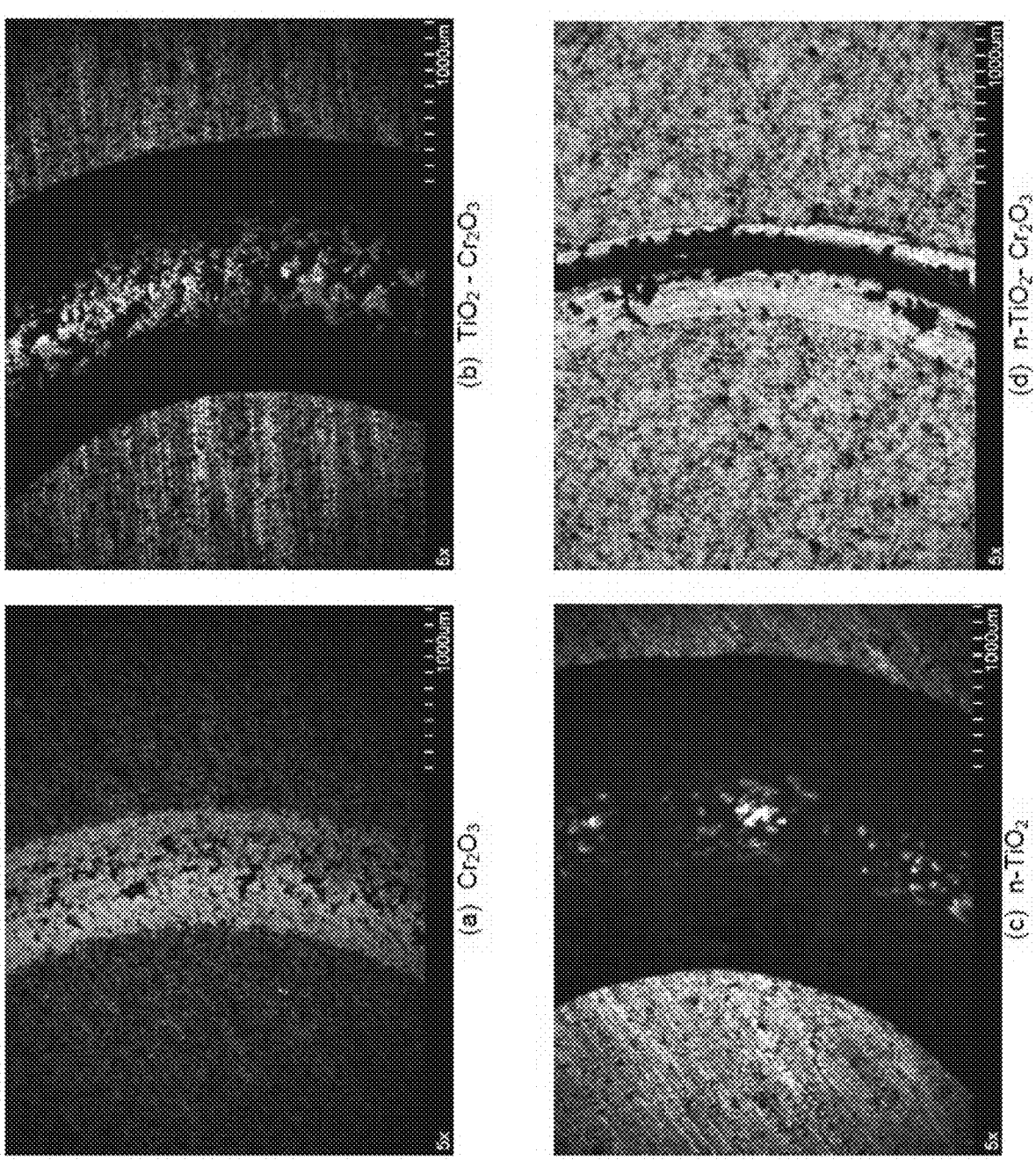
FIG. 9 shows ×50 photographs comparing the wear tracks after pin-on-disc tests for specimens coated with $Cr_2O_3$, $Cr_2O_3$—$TiO_2$, n-$TiO_2$ and n-$TiO_2$—$Cr_2O_3$.

A custom-made pin-on-disc tribometer was employed to evaluate the sliding wear behavior of the coatings. A normal load of 25 N was applied to a tungsten carbide ball (4.75 mm diameter) used as a counterpart material. A new ball was used for each test. The diameter of the wear track ring (d), n-$TiO_2$—$Cr_2O_3$ coating D3 exhibits a low wear rate of about $1.3 \times 10{-}6$ mm$^3$/(N·m). In contrast, coatings $TiO_2$—$Cr_2O_3$ (coating B) and n-$TiO_2$ (coating C) show wear rates of about $3.73 \times 10^{-5}$ and about $7.6 \times 10^{-5}$ mm$^3$/(N·m), respectively, approximately three orders of magnitude higher compared to the $Cr_2O_3$ coating A. This is in agreement with the microscopic observation of the wear tracks after pin-on-disc tests as shown in FIG. 9: Coatings $TiO_2$—$Cr_2O_3$ and n-$TiO_2$ (coatings B and C) had wide and deep wear tracks. On the contrary, $Cr_2O_3$ and n-$TiO_2$—$Cr_2O_3$ (coatings A and D3) showed small wear scars on the shallow surface, reflecting a mild abrasive wear process for these two coatings.

Dry Sand Abrasion Resistance

Coating dry abrasion resistance was tested through dry sand/rubber wheel abrasion test (ASTM G65/procedure D-modified, 45 N, 2000 wheel revolutions, Durometer A-60 wheel). Two samples were tested for each coating type. Prior testing, the sample surfaces were ground with diamond wheel to produce a surface finish of about 0.2-0.3 µm. Evaluation of the sample volume loss due to the test was performed with an optical profilometer.

Figure 10:
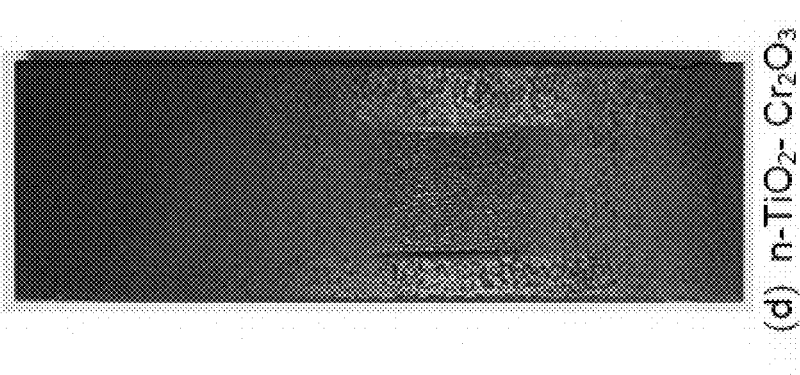
FIG. 10 shows photographs comparing the wear tracks after dry abrasion tests for specimens coated with $Cr_2O_3$, $Cr_2O_3$—$TiO_2$, n-$TiO_2$ and n-$TiO_2$—$Cr_2O_3$.
Figure 10:
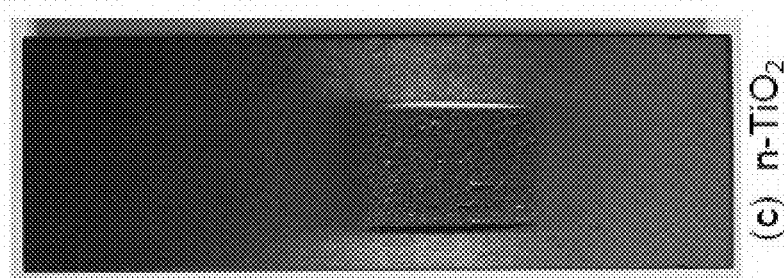
Figure 10:
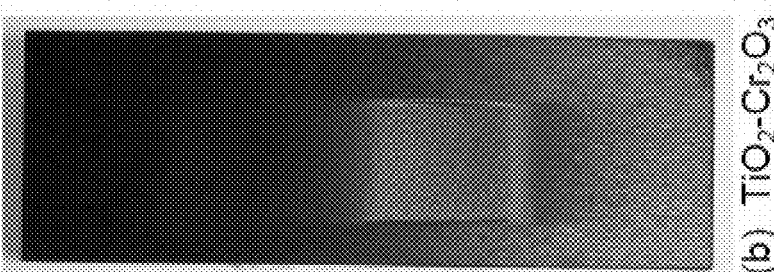
Figure 10:
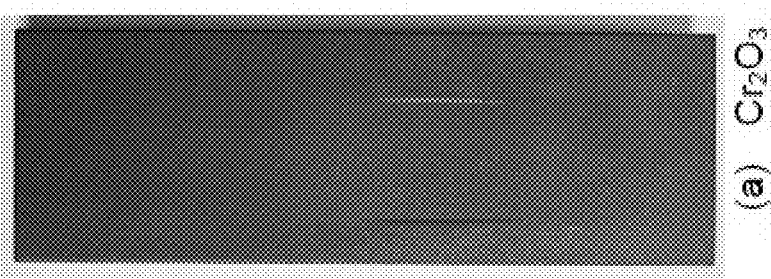

Dry abrasion volume loss was measured for coatings A, B, C and D3. The results are shown in Table 5 below. It can be seen that the best dry abrasion wear performance is achieved with the n-$TiO_2$—$Cr_2O_3$ coating D3. On the opposite, the poorest wear performance was achieved with the n-$TiO_2$ coating C, which is the coating displaying the lowest hardness. Despite the much higher hardness of the $Cr_2O_3$, coating A displayed average wear performance. This deceptive performance is attributed to $Cr_2O_3$ brittleness. The wear tracks are shown in FIG. 10.

TABLE 5

| Dry abrasion volume loss for coatings A, B, C and D3 | | | | |
| --- | --- | --- | --- | --- |
| | $Cr_2O_3$ Coating A | $TiO_2$—$Cr_2O_3$ Coating B | n-$TiO_2$ Coating C | n-$TiO_2$—$Cr_2O_3$ Coating D3 |
| Dry abrasion volume loss with method D-mod (mm$^3$, n = 2) | 17.1 ± 2.1 | 20.5 ± 0.5 | 31.6 ± 0.6 | 7.8 ± 0.6 | was 7 mm and the rotation speed was 546 revolutions per minute (rpm). This results in a linear speed of 20 cm/s (7.9 in/s). The coefficient of friction, COF, was recorded every second during the tests. The wear rate (K), was evaluated using the formula K=V/(F×S), where V is the worn volume, F is the normal load, and s is the sliding distance. Pin-on-disc wear track profiles were evaluated by the Sloan Dektak II profilometer, and the wear track morphology was examined by optical microscopy (Nickon Epiphot 200).

Figure 7:
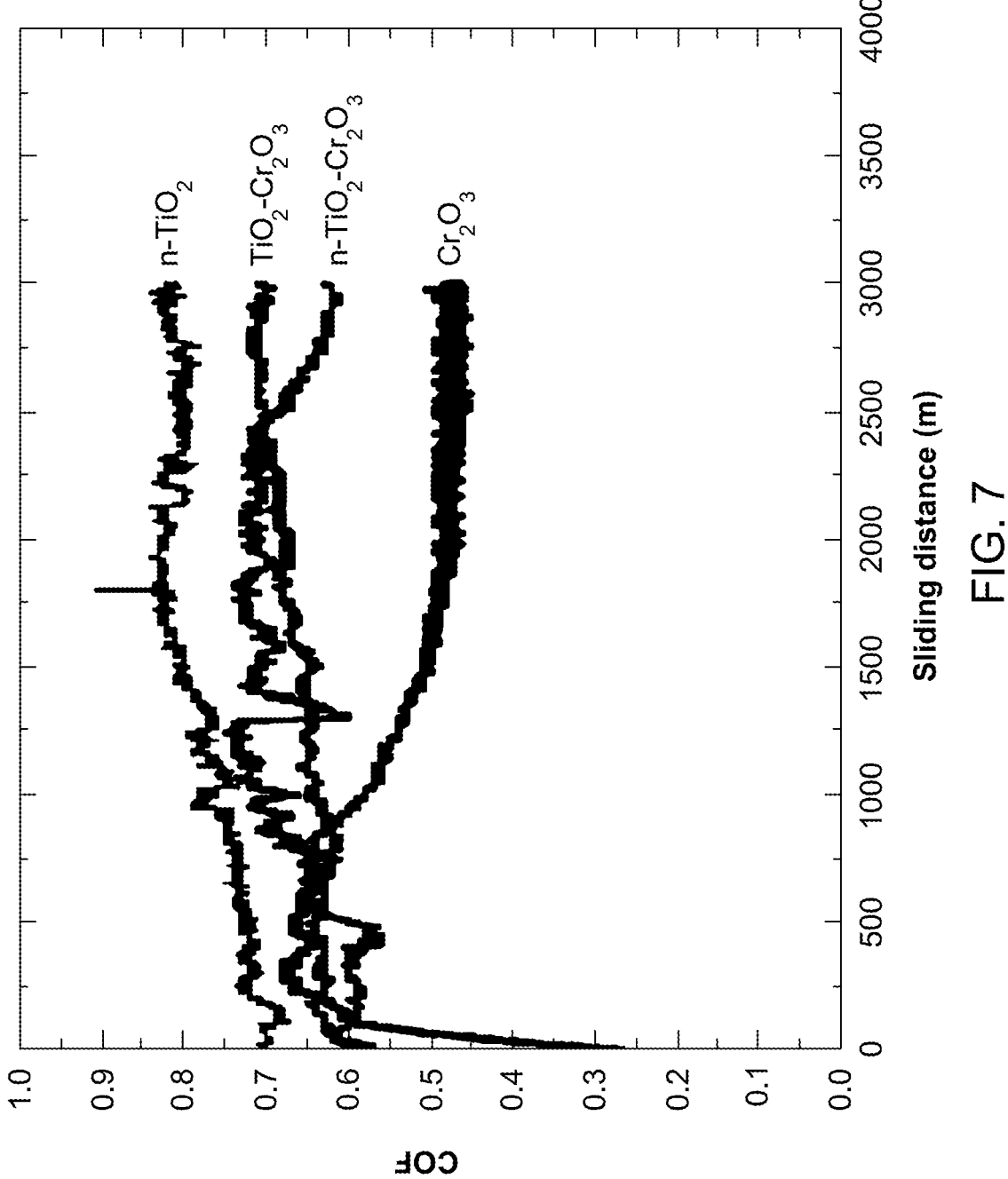
FIG. 7 is a graph showing and comparing the coefficient of friction as a function of the sliding distance for the $Cr_2O_3$, $Cr_2O_3$—$TiO_2$, n-$TiO_2$ and n-$TiO_2$—$Cr_2O_3$ coatings.

The coefficient of friction, COF, as a function of the sliding distance is shown in FIG. 7. In the first 500 m sliding distance, the COFs of different coatings exhibited a value in the range of 0.6 to 0.7. After the accommodation period (resulting in the high COF value of about 0.65 at the beginning of the wear test for $Cr_2O_3$), the COF of $Cr_2O_3$ (coating A) progressively decreased and reached a stable value of about 0.5. The COF of n-$TiO_2$—$Cr_2O_3$ coating D3 exhibited fluctuations ranging from about 0.6 to about 0.7 during its relatively long accommodation period, and it eventually reached a value of about 0.6. In comparison, coatings $TiO_2$—$Cr_2O_3$ (coating B) and n-$TiO_2$ (coating C) show a trend of progressively increasing COFs from about 0.6 to about 0.7 and from about 0.7 to about 0.8, respectively.

Figure 8:
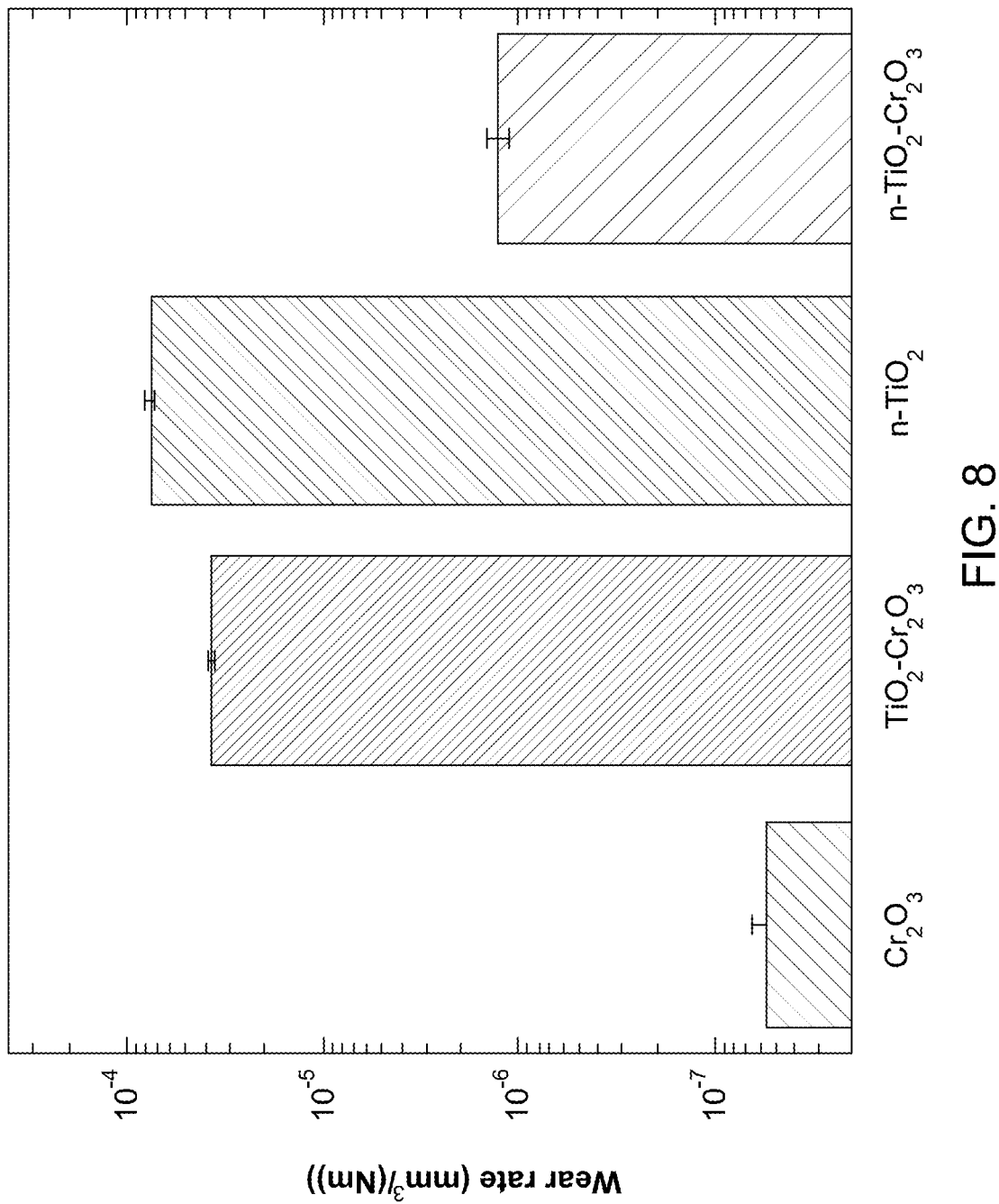
FIG. 8 is a graph showing and comparing the wear rate for the $Cr_2O_3$, $Cr_2O_3$—$TiO_2$, n-$TiO_2$ and n-$TiO_2$—$Cr_2O_3$ coatings.

Frictional behavior of various coatings correlates with their different wear resistance as shown in FIG. 8. The $Cr_2O_3$ coating A has a substantially enhanced wear resistance, showing a wear rate of about $5.5 \times 10{-}8$ mm$^3$/(N·m). The Wet Sand Abrasion Resistance Coating wet abrasion resistance by means of wet sand/rubber wheel was measured following ASTM G105-2 modified procedure guidelines using a Falex™ sand abrasion test machine and controlled slurry. For each coating type, one rectangular shape specimen (1"×3"×0.5") was submitted to 1000 and 5000 cycles runs with 22N normal load using a 7" diameter and Durometer A-60 neoprene rubber wheel at a nominal speed of 245 rpm. The slurry mixture was composed of rounded quartz grain sand AFS 50/70 and deionized water with respect to the ratio of 0.940 kg water/1.500 kg sand. Prior to testing, the sample surfaces were ground with diamond wheel to produce a surface finish of about 0.2-0.3 µm. The 1000 cycles run allow ranking for the coating wet abrasion rate. Evaluation of the sample volume loss due to the test was performed with an optical profilometer. The 5000 cycles run allowed for ranking coatings that resist penetration to its substrate while wet abrasion rate was reported as mass loss (accuracy+/−0.1 mg) of the specimen.

Wet sand abrasion after 1000 cycles was observed for coatings A, B, C and D3. As it can be seen in Table 6 below, the best performance was obtained with the n-$TiO_2$—$Cr_2O_3$ coating D3. On the opposite, and similarly to dry abrasion testing, the poorest wet abrasion performance was achieved with the n-$TiO_2$ coating C.

TABLE 6

| | $Cr_2O_3$ Coating A | $TiO_2$—$Cr_2O_3$ Coating B | n-$TiO_2$ Coating C | n-$TiO_2$—$Cr_2O_3$ Coating D3 |
|---|---|---|---|---|
| Wet abrasion volume loss according to modified ASTM G105-2 ($mm^3$, n = 2) | 10.5 ± 0.1 | 34.6 ± 0.1 | 43.0 ± 6.3 | 8.5 ± 0.2 |

Figure 11:
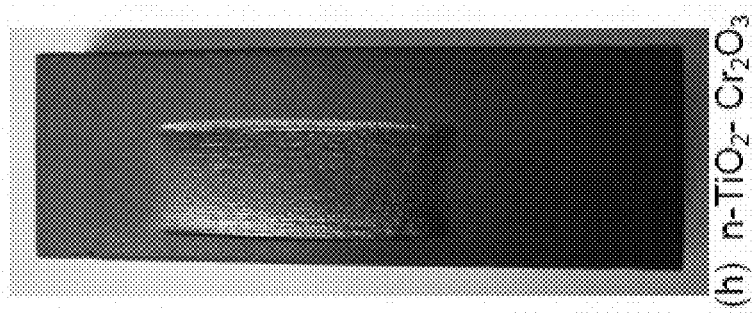
FIG. 11 shows photographs comparing wear tracks after wet abrasion tests for specimens coated with $Cr_2O_3$, $Cr_2O_3$—$TiO_2$, n-$TiO_2$ and n-$TiO_2$—$Cr_2O_3$.
Figure 11:
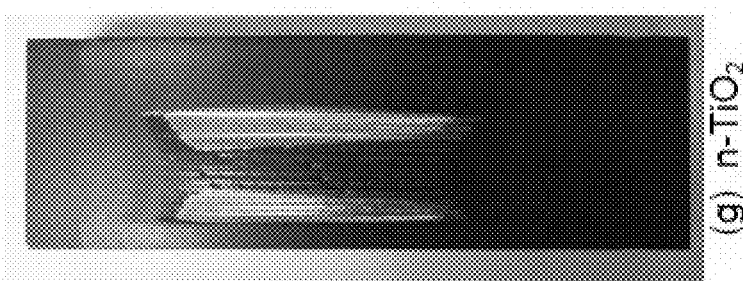
Figure 11:
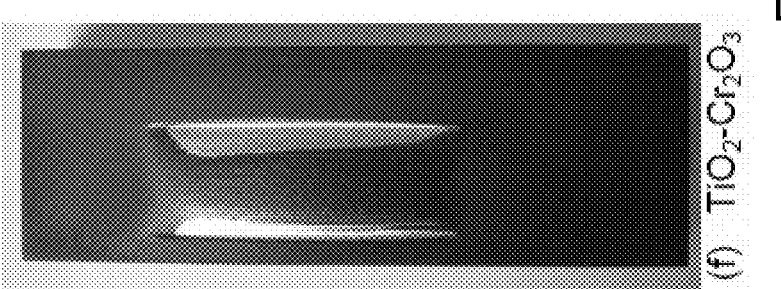
Figure 11:
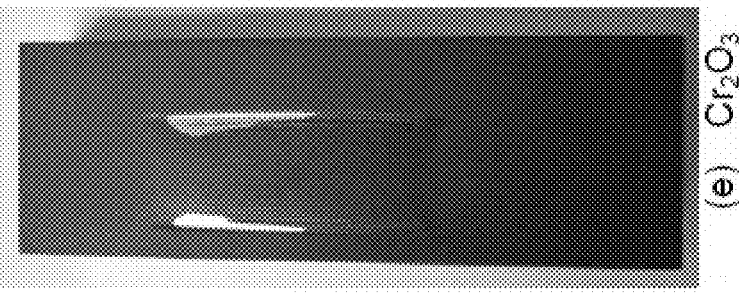

Wet sand abrasion after 5000 cycles was observed for coatings A, B, C and D3. As can be seen in FIG. 11 and in accordance with the 1000 cycles wet abrasion run and the dry abrasion results, n-$TiO_2$—$Cr_2O_3$ (coating D3) presented the best wet abrasion wear performance and was the only coating that resisted substrate penetration. At the end of the test, n-$TiO_2$—$Cr_2O_3$ mass loss was equal to 122.9 mg. $Cr_2O_3$ coating A showed a slight penetration of the substrate while both n-$TiO_2$ (coating C) and $TiO_2$—$Cr_2O_3$ (coating B) displayed the poorest performance and the largest penetrations.

Variable Temperature Galling Resistance

Figure 12:
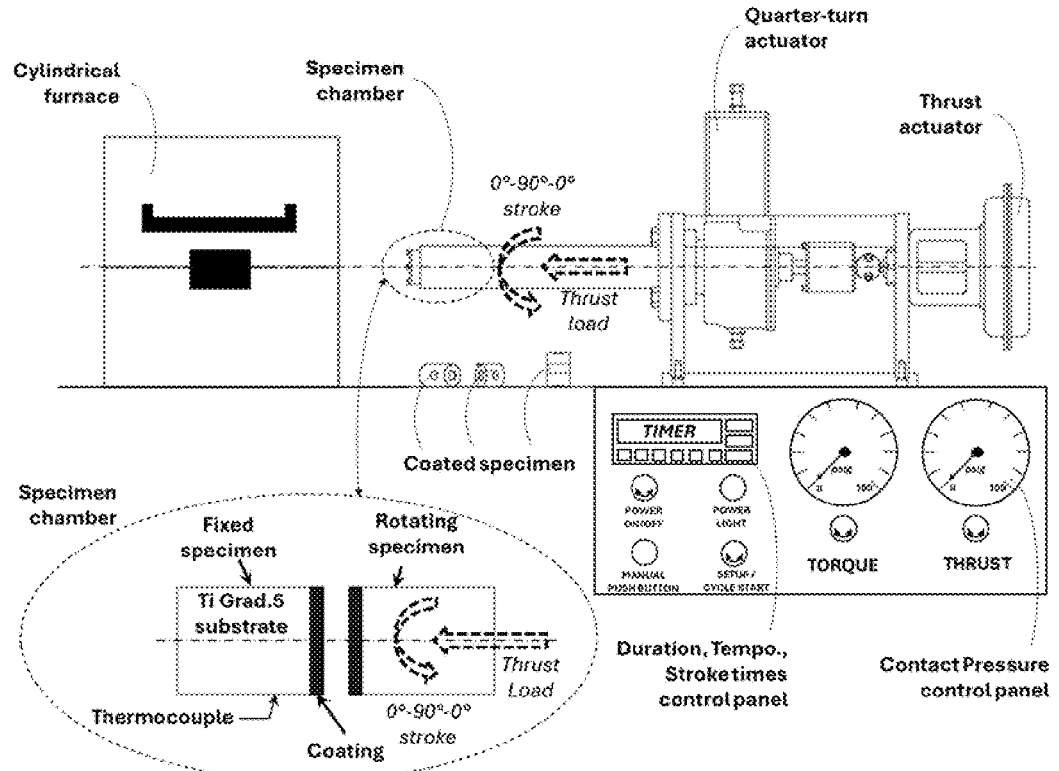
FIG. 12 shows a photograph and a schematic representation of the custom-designed and automated variable temperature galling tester used to measure the variable temperature galling resistance.

Galling resistance was measured using a custom-designed and automated galling tester (see FIG. 12). The tester consisted in quarter-turn rotating an annular coated specimen (dia. 1.25"×1.5" thickness, 1 $in^2$ coated surface) against a second annular coated and fixed specimen under controlled contact pressure, stroke motion and temperature conditions. Contact load and stroke motions were respectively applied with a pneumatic thrust actuator (Samson 3277) and a quarter-turn actuator (Metso B1CU6/20L) while the temperature was adjusted with a radiation-type furnace (Lindberg Blue M Tube Furnace) coupled with a K-Type thermocouple probe tack-welded on one specimen. All test parameters were controlled from a centralized panel. Coated surface of each specimen was successively prepared and inspected before being tested. The coated surface preparation consisted in manually polishing with several grades of polishing clothes (from P320 to P1200 grit) using a thin buffer of commercial machinery oil. The specimen inspection allowed for selecting specimens presenting a surface roughness Ra below 10 μin with a flatness below 0.005 inch in addition to measuring the specimen mass (+/−0.5 mg). For each coating type, one set of two self-mated specimens was tested according to the procedure detailed in Table 7 (see below). The test procedure was stopped as soon as one coated specimen displayed significant wear pattern (ex.: micro-welding, scoring). Repeating this test procedure for each coating type allowed material ranking based on galling resistance and total mass loss over a given period.

TABLE 7

Variable temperature galling test procedure

| Step | Duration (nb. cycles) | Specimen temperature, ° C. (° F.) | Nominal contact pressure, MPa (psi) | Nb. cycles per minute | 0°~90° and 90° 0° stroke times (s.) | Temporization at 0° and 90° position (s.) |
|---|---|---|---|---|---|---|
| 1 | 50 | R.T. | 6.9 MPa +/− 0.3 (1,000 +/− 50) | 0.2 | 10 +/− 0.5 | 140 |
| 2 | 50 | 220 +/− 7 * (428 +/− 12) | 6.9 MPa +/− 0.3 (1,000 +/− 50) | 0.2 | 10 +/− 0.5 | 140 |
| 3 | 50 | 220 +/− 7 * (428 +/− 12) | 10.3 MPa +/− 0.3 (1,500 +/− 50) | 0.2 | 10 +/− 0.5 | 140 |
| 4 | 50 | 220 +/− 7 * (428 +/− 12) | 13.8 MPa +/− 0.3 (2,000 +/− 50) | 0.2 | 10 +/− 0.5 | 140 |

\* Heating ramps are adjusted to 204° C. (400° F.) per hour.

Figure 13:
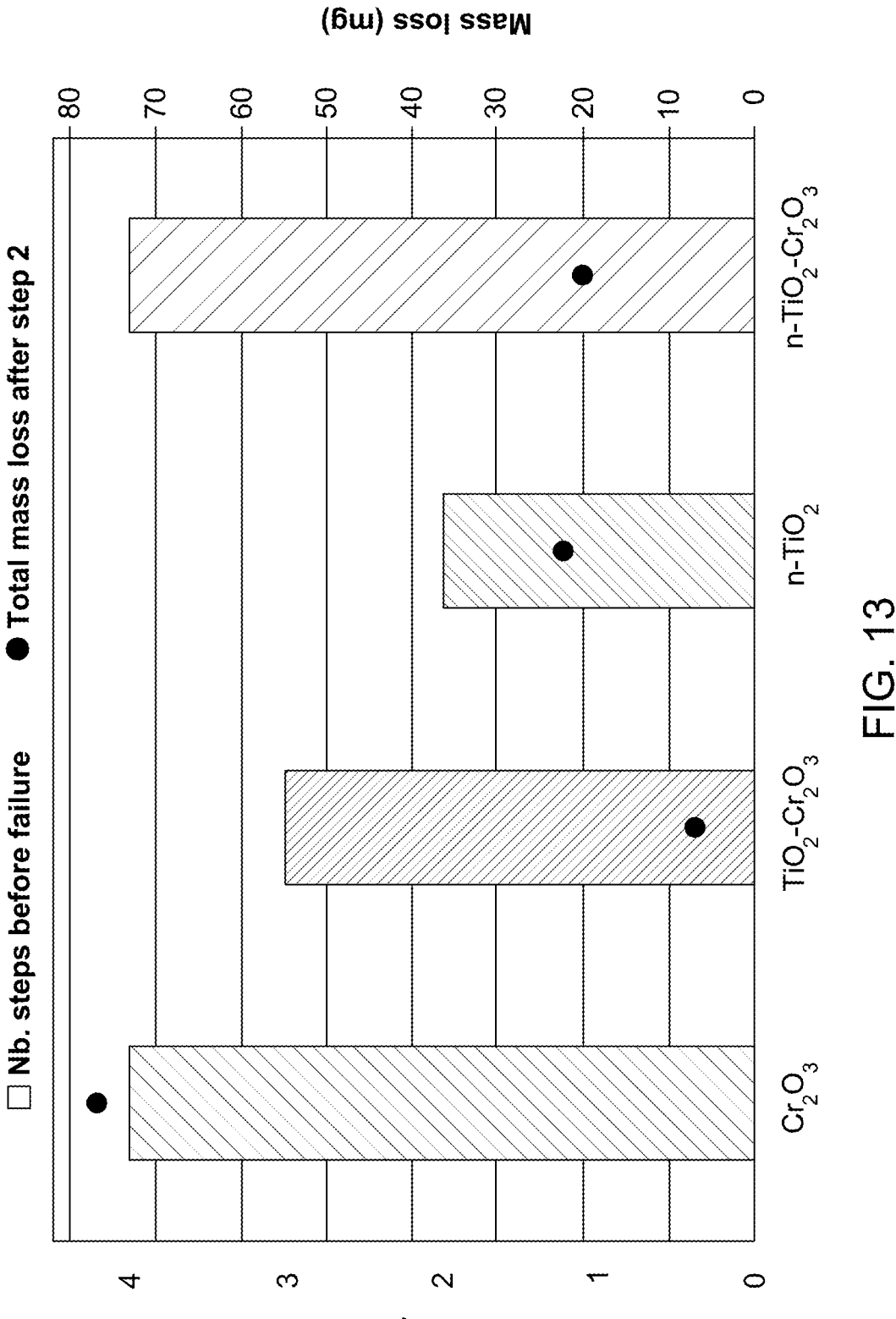
FIG. 13 is a graph showing and comparing the galling resistance of self-mated specimens after variable temperature galling resistance. Mass loss is given between 0 (initial mass) and 100 cycles (i.e. after step #2).
Figures 14A, 14B, 14C, 14D:
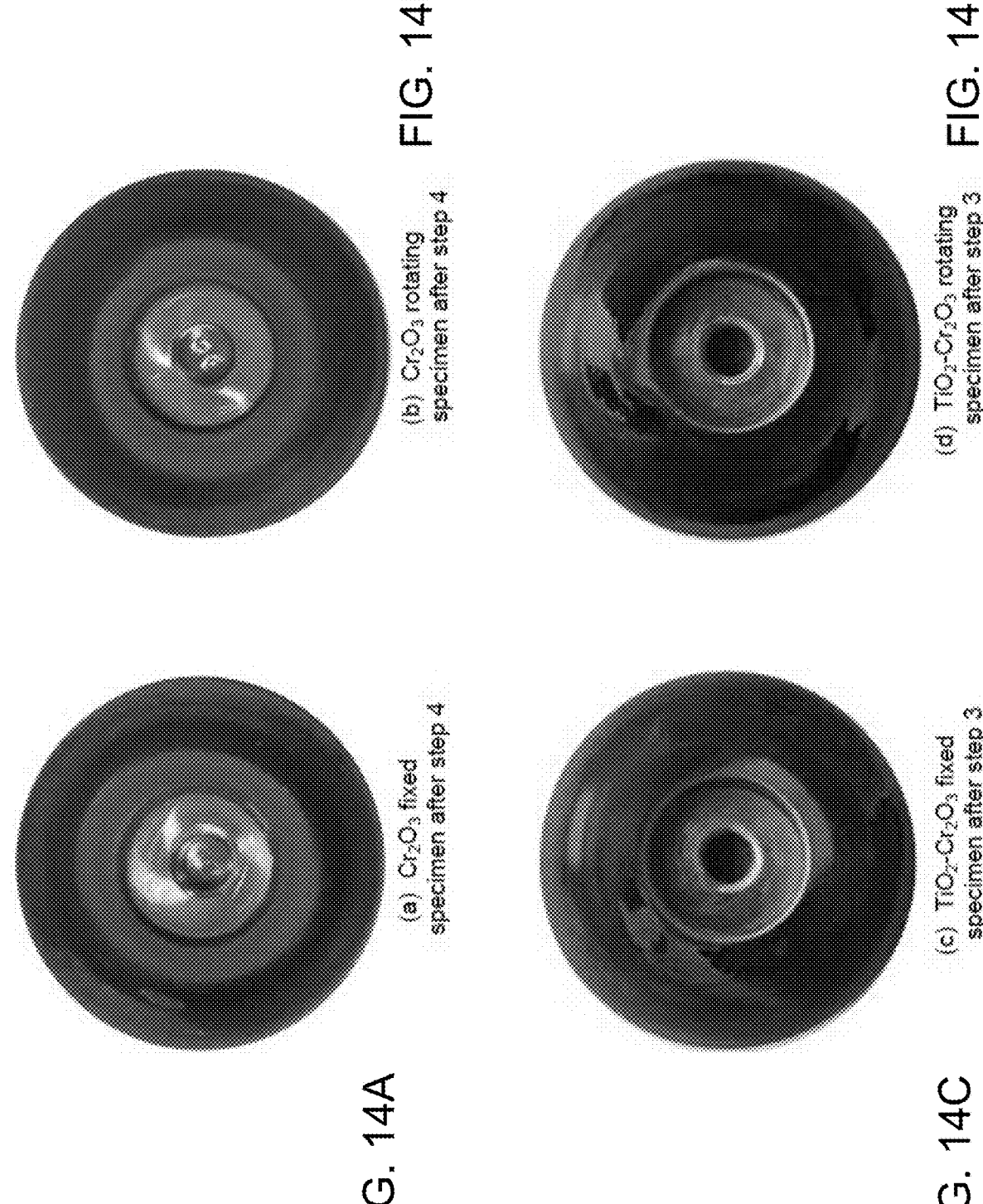
FIG. 14 includes FIG. 14A to FIG. 14H and shows photographs comparing wear patterns after variable temperature galling tests for fixed or rotating specimens coated with $Cr_2O_3$, $Cr_2O_3$—$TiO_2$, n-$TiO_2$ and n-$TiO_2$—$Cr_2O_3$.
Figures 14E, 14F, 14G, 14H:
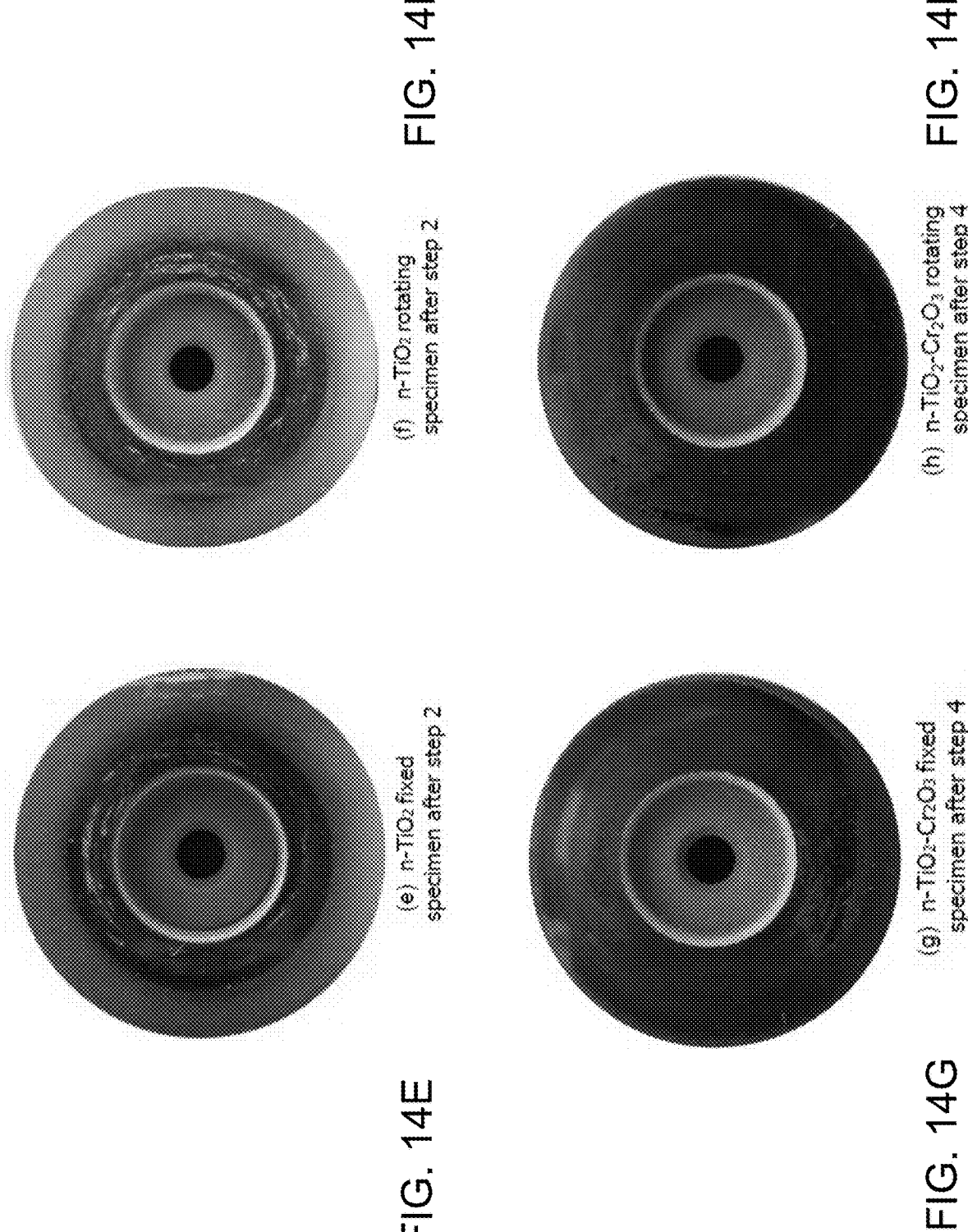

FIG. 13 shows the number of steps prior significant wear patterns observation and the total mass loss of the different self-mated specimens (rotating+fixed specimens). Total mass loss is measured between 0 cycle (initial mass) and 100 cycles (i.e. after step 2). FIGS. 14A to 14H provides macro-scale pictures of the specimens after the variable temperature galling test. It is demonstrated that $Cr_2O_3$ (FIG. 14A and FIG. 14B) and $n\text{-}TiO_2$—$Cr_2O_3$ (FIG. 14G and FIG. 14H) present the best galling resistance with apparition of light material pick-up and scoring during step #4 (200 cycles run/220° C./13.8 MPa). However, $Cr_2O_3$ mass loss after 100 cycles (77 mg) is approximately four times higher than $n\text{-}TiO_2$—$Cr_2O_3$ (20 mg). In comparison, both $n\text{-}TiO_2$ (FIG. 14E and FIG. 14F) and $TiO_2$—$Cr_2O_3$ (FIG. 14C and FIG. 14D) combine intermediate galling resistance with low mass loss. They respectively show galling, microwelding and material pick-up at step #2 (100 cycles run/220° C./6.9 MPa) and step #3 (150 cycles run/220° C./10.3 MPa) while their mass loss stay below 22 mg after 100 cycles. It is assumed that $Cr_2O_3$ high mass loss in comparison to other specimens is mainly due to its brittleness. By achieving the highest number of steps prior significant wear patterns observation and by exhibiting a low mass loss, $n\text{-}TiO_2$—$Cr_2O_3$ (coating D3) ranks 1st. $Cr_2O_3$, $TiO_2$—$Cr_2O_3$, $n\text{-}TiO_2$ are respectively ranked 2nd, 3rd and 4th.

Several alternative implementations and examples have been described and illustrated herein. The implementations of the invention described above are intended to be exemplary only. A person of ordinary skill in the art would appreciate the features of the individual implementations, and the possible combinations and variations of the components. A person of ordinary skill in the art would further appreciate that any of the implementations could be provided in any combination with other implementations disclosed herein. It is understood that the invention may be embodied in other specific forms without departing from the spirit or central characteristics thereof. The present examples and implementations, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A method for depositing a nanostructured titanium (IV) oxide ($n\text{-}TiO_2$)-chromium (III) oxide ($Cr_2O_3$) coating on a mechanical part of a High-Pressure Acid Leach (HPAL) metal-seated ball valve, the method comprising:

a step (a) of mixing a powder of sprayable nanostructured titanium (IV) oxide ($n\text{-}TiO_2$) and a powder of micron-sized chromium (III) oxide ($Cr_2O_3$), thereby obtaining a powder blend of sprayable nanostructured titanium (IV) oxide ($n\text{-}TiO_2$)-chromium (III) oxide ($Cr_2O_3$), wherein the powder blend consists of 50 wt % to 60 wt % of nTiO2 and 40 wt % to 50 wt % of $Cr_2O_3$, and a step (b) of thermal spraying particles of the $n\text{-}TiO_2$—$Cr_2O_3$ powder blend onto a mechanical part of the valve, the mechanical part being subjected to wear due to friction with other parts of the valve during operation of the valve, by air plasma spraying (APS) at an average in-flight particle temperature between 2400° C. and 2800° C. and an average particle in-flight velocity of or greater than 350 m/s;

wherein the $n\text{-}TiO_2$—$Cr_2O_3$ coating is a two-phase coating having a $n\text{-}TiO_2$ phase and a $Cr_2O_3$ phase, and wherein the step (a) precedes the step (b).

2. The method of claim 1, wherein the ceramic coating has a microhardness between 1150 and 1250 HV.

3. The method of claim 2, wherein the HPAL metal-seated ball valve comprises one of titanium, a titanium alloy, stainless steel, steel, a high-performance nickel alloy, a high-performance cobalt alloy, bronze and a copper alloy.

4. The method of claim 3, wherein the HPAL metal-seated ball valve comprises one of titanium and stainless steel.

5. The method of claim 1, wherein the powder of sprayable $n\text{-}TiO_2$ comprises nanosized constituents agglomerated and/or sintered in microsized $n\text{-}TiO_2$ particles.

6. The method of claim 5, wherein the nanosized constituents have a size ranging from 50 nm to 500 nm.

7. The method of claim 5, wherein the microsized $n\text{-}TiO_2$ particles have a diameter distribution ranging from 4 μm to 100 μm.

8. The method of claim 1, wherein the $n\text{-}TiO_2$—$Cr_2O_3$ powder blend comprises 40 wt % to 70 wt % of $n\text{-}TiO_2$ and 30 wt % to 60 wt % of $Cr_2O_3$.

9. The method of claim 8, wherein the $n\text{-}TiO_2$—$Cr_2O_3$ powder blend comprises 50 wt % to 60 wt % of $n\text{-}TiO_2$ and 40 wt % to 50 wt % of $Cr_2O_3$.

10. The method of claim 8, wherein the $n\text{-}TiO_2$—$Cr_2O_3$ powder blend comprises 53 wt % to 57 wt % of $n\text{-}TiO_2$ and 43 wt % to 47 wt % of $Cr_2O_3$.

11. The method of claim 8, wherein the $n\text{-}TiO_2$—$Cr_2O_3$ powder blend comprises about 55 wt % of $n\text{-}TiO_2$ and about 45 wt % of $Cr_2O_3$.

12. The method of claim 1, wherein the average in-flight particle temperature is 2350° C. to 2800° C.

13. The method of claim 12, wherein the average in-flight particle temperature is 2400° C. to 2800° C.

14. The method of claim 12, wherein the average in-flight particle temperature is 2500° C. to 2800° C.

15. The method of claim 12, wherein the average in-flight particle temperature is of about 2590° C.

16. The method of claim 1, wherein the average particle in-flight velocity is greater than 400 m/s.

17. The method of claim 16, wherein the average particle in-flight velocity is greater than 450 m/s.

18. The method of claim 17, wherein the average particle in-flight velocity is about 457 m/s.

19. The method of claim 1, wherein the $n\text{-}TiO_2$—$Cr_2O_3$ coating has a microhardness of at least 1000 HV as measured under a 300 gf load.

* * * * *